United States Patent
Neumann

(10) Patent No.: US 11,640,403 B2
(45) Date of Patent: May 2, 2023

(54) METHODS AND SYSTEMS FOR AUTOMATED ANALYSIS OF BEHAVIOR MODIFICATION DATA

(71) Applicant: Kenneth Neumann, Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 131 days.

(21) Appl. No.: 16/502,779

(22) Filed: Jul. 3, 2019

(65) Prior Publication Data

US 2021/0004377 A1    Jan. 7, 2021

(51) Int. Cl.
| | | |
|---|---|---|
| *G06F 16/00* | (2019.01) | |
| *G06F 16/2457* | (2019.01) | |
| *G06F 16/248* | (2019.01) | |
| *G06N 20/00* | (2019.01) | |
| *G06F 16/25* | (2019.01) | |
| *G06F 16/30* | (2019.01) | |
| *G06F 3/0482* | (2013.01) | |

(52) U.S. Cl.
CPC ...... *G06F 16/24575* (2019.01); *G06F 16/248* (2019.01); *G06F 16/252* (2019.01); *G06N 20/00* (2019.01); *G06F 3/0482* (2013.01)

(58) Field of Classification Search
None
See application file for complete search history.

(56) References Cited

U.S. PATENT DOCUMENTS

| | | | |
|---|---|---|---|
| 1,011,266 A * | 12/1911 | Sundh .................... | A01D 51/00 254/335 |
| 8,234,129 B2 * | 7/2012 | Michon .................. | G16B 20/00 600/300 |
| 9,185,238 B1 | 11/2015 | Freeland et al. | |
| 9,600,297 B1 | 3/2017 | Buyukkokten | |
| 9,948,689 B2 | 4/2018 | Savage et al. | |
| (Continued) | | | |

OTHER PUBLICATIONS

Online spiritual advisor services; http://www.askforadvisors.com/psychic-readings/index.php; Apr. 22, 2019.

(Continued)

*Primary Examiner* — Polina G Peach
(74) *Attorney, Agent, or Firm* — Caldwell Intellectual Property Law

(57) ABSTRACT

A system for automated analysis of behavior modification data. The system includes at least a server. The system includes a receiving module operating on the at least a server designed and configured to receive at least a request for a behavior modification and extract at least an expert quality as a function of the at least a request for a behavior modification. The system includes an expert module operating on the at least a server designed and configured to generate at least an expert list as a function of the at least an expert quality and the at least a request for a behavior modification, receive at least a user input selecting at least a selected expert as a function of the at least an expert list, generate at least a request the selected expert and transmit the at least a request for a behavior modification to the selected expert.

18 Claims, 15 Drawing Sheets

(56) References Cited

U.S. PATENT DOCUMENTS

| | | | |
|---|---|---|---|
| 9,965,553 B2 | 5/2018 | Lyren | |
| 10,061,894 B2* | 8/2018 | Sethumadhavan | G16H 10/60 |
| 10,168,866 B2 | 1/2019 | Wakeen | |
| 10,225,365 B1* | 3/2019 | Hotchkies | H04L 67/63 |
| 10,311,372 B1* | 6/2019 | Hotchkies | H04L 67/1097 |
| 10,468,142 B1* | 11/2019 | Abou Shousha | G16H 50/20 |
| 10,600,105 B1* | 3/2020 | Kumar | G06Q 30/0637 |
| 2009/0043801 A1* | 2/2009 | LeClair | G06Q 40/08 |
| 2009/0048903 A1 | 2/2009 | Lieberman | |
| 2009/0093688 A1* | 4/2009 | Mathur | A61B 5/411 |
| | | | 600/300 |
| 2009/0259488 A1* | 10/2009 | Gounares | G16H 70/20 |
| | | | 705/7.42 |
| 2010/0241454 A1* | 9/2010 | Firminger | G06F 19/3481 |
| | | | 705/3 |
| 2014/0276244 A1 | 9/2014 | Kamyar | |
| 2014/0324457 A1* | 10/2014 | Kim | G06Q 50/24 |
| | | | 705/3 |
| 2014/0350954 A1* | 11/2014 | Ellis | G16H 10/60 |
| | | | 705/2 |
| 2015/0006261 A1* | 1/2015 | Gutman | G06Q 50/22 |
| | | | 705/7.39 |
| 2015/0073943 A1* | 3/2015 | Norris | G06F 16/24575 |
| | | | 705/26.63 |
| 2015/0279171 A1* | 10/2015 | Hyde | G06F 3/04842 |
| | | | 340/815.4 |
| 2016/0162785 A1 | 6/2016 | Grobman | |
| 2016/0212076 A1 | 7/2016 | Bellissimo et al. | |
| 2016/0314265 A1 | 10/2016 | Sternberg et al. | |
| 2017/0039502 A1* | 2/2017 | Guman | G06Q 50/22 |
| 2017/0053080 A1* | 2/2017 | Geppert | G06Q 10/06 |
| 2017/0235849 A1 | 8/2017 | Jacob | |
| 2017/0235912 A1* | 8/2017 | Moturu | G16H 40/67 |
| | | | 705/2 |
| 2017/0323064 A1* | 11/2017 | Bates | A61B 5/7465 |
| 2017/0351830 A1* | 12/2017 | Burger | G16H 20/00 |
| 2018/0001184 A1* | 1/2018 | Tran | H04N 5/2257 |
| 2018/0121619 A1* | 5/2018 | Perlroth | G16H 40/20 |
| 2018/0166157 A1* | 6/2018 | Firminger | G16H 10/60 |
| 2019/0027052 A1 | 1/2019 | Moore | |
| 2019/0139648 A1* | 5/2019 | Rutledge | G16H 10/60 |
| 2019/0385126 A1* | 12/2019 | Morrow | G06N 20/00 |
| 2020/0334809 A1* | 10/2020 | Vianu | G06V 30/333 |
| 2020/0342969 A1* | 10/2020 | White | G06Q 30/0206 |

OTHER PUBLICATIONS

24 Astro Spiritual Advisor; https://play.google.com/store/apps/details?id=infrasat.astro24; Feb. 18, 2019.

Chatnow; https://chatnow.org/; Apr. 22, 2019.

* cited by examiner

Expert Quality Database 160

| Love 700 | Joy 704 | Peace 708 | Patience 712 |
| Kindness 716 | Goodness 720 | Faithfulness 724 | Gentleness 728 |

*FIG. 7*

Variables Database 420

| Expert Experience 800 | Expert Gender 804 | Expert Location 808 | Expert Age 812 |
| Expert Qualification 816 | Previous Encounter 820 | Expert Recommendation 824 | Miscellaneous 828 |

*FIG. 8*

METHODS AND SYSTEMS FOR AUTOMATED ANALYSIS OF BEHAVIOR MODIFICATION DATA

FIELD OF THE INVENTION

The present invention generally relates to the field of artificial intelligence. In particular, the present invention is directed to methods and systems for an online support group for behavior modification.

BACKGROUND

Automated analysis of behavior modification data can be challenging due to the multiplicity of types and source of data to be analyzed. Furthermore, burgeoning knowledge concerning how to best provide support and encourage a behavior modification have further exacerbated this problem.

SUMMARY OF THE DISCLOSURE

A system for automated analysis of behavior modification data. The system includes at least a server. The system includes a receiving module operating on the at least a server the receiving module designed and configured to receive at least a request for a behavior modification and extract at least an expert quality as a function of the at least a request for a behavior modification. The system includes an expert module operating on the at least a server the expert module designed and configured to generate at least an expert list as a function of the at least an expert quality and the at least a request for a behavior modification, receive at least a user input as a function of the at least an expert list and select at least an expert, generate at least a request for the selected expert; and transmit the at least a request for a behavior modification to the selected expert.

A method of automated analysis of behavior modification data. The method includes receiving by at least a server at least a request for a behavior modification. The method includes extracting by the at least a server at least an expert quality as a function of the at least a request for a behavior modification. The method includes generating by the at least a server at least an expert list as a function of the at least an expert quality. The method includes receiving by the at least a server at least a user input as a function of the at least an expert list and selecting at least an expert. The method includes generating by the at least a server at least a request for the selected expert. The method includes transmitting by the at least a server the at least a request for the behavior modification to the selected expert.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a block diagram illustrating an exemplary embodiment of an expert quality database;

FIG. 8 is a block diagram illustrating an exemplary embodiment of a variables database;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods and systems for automated analysis of behavior modification data. In an embodiment, a user and/or an informed advisor may generate at least a request for a behavior modification. At least a request for a behavior modification may include for example, a request to stop a particular pattern of behavior or trait such as a desire to stop smoking, obtain more exercise, or quit drinking alcohol for example. At least a request for a behavior modification is utilized to extract at least a quality of an expert who may function to provide a user with encouragement, support, and advice to aid a user in overcoming a behavior modification. Different qualities may be desirable and/or undesirable for an expert as a function of the at least a request for a behavior modification. For example, a behavior modification such as drug addiction may be desirable to have an expert who is accountable and reliable but and not easily tempted by evil forces. User inputs and qualities may then be utilized to select an expert who may become part of a user's inner circle and aid a user in overcoming a particular behavior modification or allowing a behavior modification to enter a phase whereby it is maintained if it cannot be completely eliminated.

Figure 1:
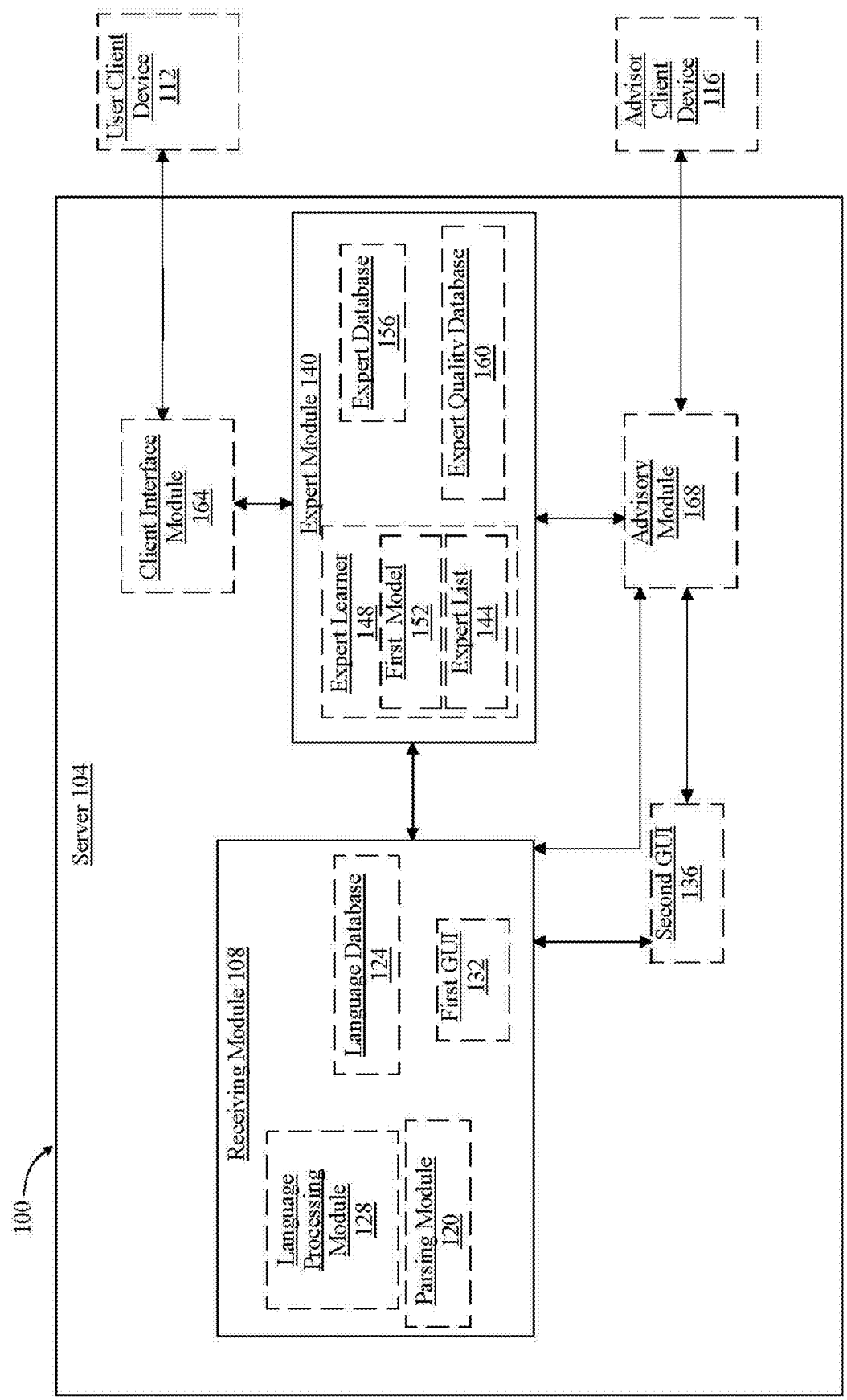
FIG. 1 is a block diagram illustrating an exemplary embodiment of a system for an online support group for behavior modification.

Referring now to FIG. 1, an exemplary embodiment of a system 100 for automated analysis of behavior modification data is illustrated. System 100 includes at least a server. At least a server 104 may include any computing device as described herein, including without limitation a microcontroller, microprocessor, digital signal processor (DSP) and/or system on a chip (SoC) as described herein. At least a server 104 may be housed with, may be incorporated in, or may incorporate one or more sensors of at least a sensor. Computing device may include, be included in, and/or communicate with a mobile device such as a mobile telephone or smartphone. At least a server 104 may include a single computing device operating independently, or may include two or more computing device operating in concert, in parallel, sequentially or the like; two or more computing devices may be included together in a single computing device or in two or more computing devices. At least a server 104 electronically communicates with one or more additional devices, as described below in further detail, via a network interface device. Network interface device may be utilized for connecting a at least a server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 104 may include but is not limited to, for example, a at least a server 104 or cluster of computing devices in a first location and a second computing device or cluster of computing devices in a second location. At least a server 104 may include one or more computing devices dedicated to data storage, security, distribution of traffic for load balancing, and the like. At least a server 104 may distribute one or more computing tasks as described below across a plurality of computing devices of computing device, which may operate in parallel, in series, redundantly, or in any other manner used for distribution of tasks or memory between computing devices. At least a server 104 may be implemented using a "shared nothing" architecture in which data is cached at the worker; in an embodiment, this may enable scalability of system 100 and/or computing device.

With continued reference to FIG. 1, at least a server 104 and/or one or more modules operating thereon may be designed and/or configured to perform any method, method step, or sequence of method steps in any embodiment described in this disclosure, in any order and with any degree of repetition. For instance, at least a server 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 104 and/or one or more modules operating thereon may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a receiving module 108 operating on the at least a server. Receiving module 108 may include any suitable hardware or software module. Receiving module 108 is designed and configured to receive at least a request for a behavior modification and extract at least an expert quality as a function of the at least a request for a behavior modification.

With continued reference to FIG. 1, a "request for a behavior modification" as used herein is a request for a modification, which may be referred to in this disclosure as "behavior modification," to any action or response to a particular situation or stimulus. A behavior modification may include physical addictions to substances such as alcohol, tobacco, opioids, drugs, cocaine, cannabis, amphetamines, hallucinogens, inhalants, phencyclidine and the like. Behavior modification may include impulse control disorders such as intermittent explosive disorder, kleptomania, pyromania, gambling and the like. Behavior modification may include addictions to certain actions such as food, sex, pornography, computer use, device use such as cellphones, tablets, and the like; work, exercise, spiritual obsession, pain seeking, cutting, shopping and the like. Behavior modification may include modification to a trait one may exhibit in personal relationships at home, work, or school such as winning too much, passing judgment, making destructive comments, speaking when angry, extreme negativity, withholding information, making excuses, clinging to the past, playing favorites, failing to listen, failing to express gratitude, and the like. Behavior modification may include modification to thoughts, words, actions and deeds such as sexual immorality including impurity, orgies, and lust, idolatry including witchcraft, selfish ambition, demons, and demigods, debauchery including drunkenness, filthy language, and corruption, hatred including malice, deceit, and fits of rage, jealousy including envy, anger, greed and slander. Behavior modification may include modification to a trait a user may exhibit surrounding one's lifestyle such as a desire to lose weight, a desire to develop a spirituality practice, attend training sessions at a gym more frequently, develop a meditation practice, meet with a nutrition professional to discuss food plans and the like. Behavior modification may include modification to a trait a user seeks to attain. For example, behavior modification may include a desire to be driven by thoughts, words, actions and deeds surrounding traits such as love, joy, peace, patience, kindness, goodness, faithfulness, gentleness, and self-control. At least a request for a behavior modification may be received using any methodology as described herein including for example receiving at least a request for a behavior modification over a network connection.

With continued reference to FIG. 1, receiving module 108 may extract at least an expert quality as a function of the at least a request for a behavior modification. An "expert quality" as used herein includes any attribute or characteristic exhibited by at least an expert. Expert qualities may include for example positive qualities that a user may desire in an expert such as trustworthiness, vigilance and/or watchfulness, wisdom, loyalty, unconditional love, supportiveness, reliability, self-control, rejecting evil, kindness, truthfulness, ability to give good advice, positive influence, cooperative, attitude of service, knowledge about user, family commitment, high standards, share burdens, encouraging user to trust in a higher power, humility, forgiveness, peacefulness, acceptance, and/or generosity. Expert qualities may include for example negative qualities that a user seeks to avoid in an expert such as drunkenness, filthy language, corruption, malice, deceit, hatred, jealousy, greed, and the like. For example, a user who is experiencing opioid addictions may generate at least a request for an expert who portrays qualities such as unconditional love, positive influence, and encouraging user to trust in a higher power while avoiding at least an expert who exhibits qualities such as negativity, deceit, and drunkenness. In yet another non-limiting example, a user who is obese and desires to lose weight may generate at least a request for an expert who portrays qualities such as supportiveness and reliability and who does not portray qualities such as greed or lack of self-control.

With continued reference to FIG. 1, at least an expert may include any individual that may aid a user in achieving user's behavior modification by providing assistance to a user such as by providing encouragement, support, mentorship, guidance, and/or services. An expert may include for example an informed advisor, family, friends, members of the community, members of a support group, coaches, religious leaders, health advisors such as nutritionists or addiction therapists, co-workers, acquittances and the like. An expert may include for example, a nutritionist, a health coach, an addiction specialist, a close family friend, a church member, a participant at a 12-step program such as alcoholics anonymous or narcotics anonymous, and the like.

With continued reference to FIG. 1, at least a request for a behavior modification may be received from a user client device 112. A user client device 112 may include, without limitation, a display in communication with server 104; display may include any display as described in this disclosure. A user client device 112 may include an additional computing device, such as a mobile device, laptop, desktop computer, or the like; as a non-limiting example, the user client device 112 may be a computer and/or workstation operated by a user. In an embodiment, a behavior modification received from a user client device 112 may be received from a user client device 112 operated by a user. For example, a user may generate a behavior modification that contains a request to quit drinking alcohol. In an embodiment, at least a request for a behavior modification may be received from a user client device 112 operated by a friend, family member, co-worker, and/or acquittance who may generate a request for a behavior modification from that person's own user client device 112 for the user. For example, a concerned family member of a user such as user's sister may generate at least a request for a behavior modification for user from sister's own user client device 112.

With continued reference to FIG. 1, at least a request for a behavior modification may be received from an advisory client device. Advisory client device may include any device suitable for use as a user client device 112. In an embodiment, advisor client device 116 may be operated by an informed advisor. Informed advisor may include, without limitation, a medical professional such as a doctor, nurse, nurse practitioner, functional medicine practitioner, any professional with a career in medicine, nutrition, genetics, fitness, life sciences, spirituality, Christianity, insurance, and/or any other applicable industry that may contribute information and data to system 100 in regards to medical needs. An informed advisor may include for example, a spiritual or philosophical advisor such as a religious leader, a pastor, imam, rabbi, a religious teacher, or the like. For example, an informed advisor such as meditation teacher may generate at least a request for a behavior modification for a user such as one of the meditation teacher's students. In such an instance, the medication teacher may generate the at least a request for a behavior modification for the teacher's student from advisory client device. In yet another non-limiting example, an informed advisor such as a functional medicine doctor may generate at least a request for a behavior modification from advisory client device for a patient who self-reports to the functional medicine doctor an opioid addiction.

With continued reference to FIG. 1, system 100 may include parsing module 120. Parsing module 120 may include any suitable hardware or software module. Parsing module 120 may be designed and configured to parse the at least a request for a behavior modification and extract at least an expert quality as a function of the at least a request for behavior modification. As a non-limiting example, parsing modules 120 may extract at least an expert quality from a database using the at least a request for a behavior modification. Parsing module 120 may be designed and configured to extract from the at least a request for a behavior modification one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, images such as emojis, whitespace, and other symbols. Textual data may be parsed into segments, which may include a simple word (sequence of letters separated by whitespace) or more generally a sequence of characters as described previously. The term segments as used herein refers to any smaller, individual groupings of text from a larger source of text; segments may be broken up by word, pair of words, sentence, or other delimitation. These segments may in turn be parsed in various ways. Textual data may be parsed into words or sequences of words, which may be considered words as well. Textual data may be parsed into "n-grams", where all sequences of n consecutive characters are considered. Any or all possible sequences of segments or words may be stored as "chains", for example for use as a Markov chain or Hidden Markov Model.

With continued reference to FIG. 1, system 100 may include language database. Language database 124 may include any data structure for ordered storage and retrieval of data, which may be implemented as a hardware or software module. Language database 124 may be implemented, without limitation, as a relational database, a key-value retrieval datastore such as a NOSQL database, or any other format or structure for use as a datastore that a person skilled in the art would recognize as suitable upon review of the entirety of this disclosure. In an embodiment, parser may access language database 124 to determine the meaning of at least a request for a behavior modification. Language database 124 may contain a glossary table that may contain information such as contextual meaning of at least a request for a behavior modification. Language database 124 may contain a voice recognition table that may identify spoken commands such as when a user may enter a request for a behavior modification through a voice to text option. Language database 124 may contain a natural language table that may contain information pertaining to meaning of common language terms used in general conversations. Language database 124 may contain a linking table that may contain links between behavior modifications and experts such as categories of behavior modifications and categories of experts that may be useful in aiding a user with a particular behavior modification. For example, a behavior modification for opioid addiction may be linked to an expert such as a functional medicine doctor while a behavior modification for spiritual guidance may be linked to a religious teacher such as a pastor at a church or a church member.

With continued reference to FIG. 1, information describing significant categories of behavior modifications, relationships of such categories to specific experts and/or categories of experts, may alternatively or additionally be extracted from one or more requests for a behavior modification and/or one or more documents using language processing module 128. Language processing module 128 may include any hardware and/or software module. Any module and/or hardware and/or software component as described in this disclosure may be created using any combination of hardware and/or software logic commands and may be physically or conceptually separate from or merged with any other such module, as persons skilled in the art will appreciate upon reviewing the entirety of this disclosure. Language processing module 128 may be configured to extract one or more words. One or more words may include any of the one or more words that may be extracted by parsing module 120 as described above.

With continued reference to FIG. 1, language processing module 128 may compare extracted words to one or more categories of behavior modifications, one or more categories of expert qualities, and/or one or more categories of experts; such data for comparison may be entered on server 104 using expert inputs In an embodiment, one or more categories may be enumerated, to find total count of mentions in such documents and/or requests for behavior modification. Alternatively or additionally, language processing module 128 may operate to produce a language processing model. Language processing model may include a program automatically generated by server 104 and/or language processing module 128 to produce associations between one or more words extracted from at least a request for a behavior modification and/or documents to produce associations between one or more words extracted from at least a request for a behavior modification and/or documents and detect associations, including without limitation mathematical associations, between such words, and/or associations of extracted words with categories of behavior modifications, relationships of such categories to expert qualities and/or categories of experts. Associations between language elements, where language elements include for purposes herein extracted words, categories of behavior modifications, relationships of such categories to expert qualities and/or categories of experts may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of behavior modification, a given relationship of such categories to expert qualities, and/or a given category of expert. As a further example, statistical correlations and/or mathematical associations may include probabilistic formulas or relationships indicating a positive and/or negative association between at least an extracted word and/or a given category of behavior modification, a given relationship of such category to expert quality, and/or a given category of experts; positive or negative indication may include an indication that a given behavior modification is or is not indicating a category of expert quality, a given relationship of such category to excerpt qualities, and/or a given category of expert is or is not significant. For instance, and without limitation, a negative indication may be determined from a phrase such as "developing a spiritual practice is not associated with a functional medicine doctor" whereas a positive indication may be determined form a phrase such as "alcoholism is associated with a functional medicine doctor" as an illustrative example; whether a phrase, sentence, word, or other textual element in a request for a behavior modification, in a document or corpus of documents constitutes a positive or negative indicator may be determined, in an embodiment, by mathematical associations between detected words, comparisons to phrases and/or words indicating positive and/or negative indicators that are stored in memory at server 104, or the like.

With continued reference to FIG. 1, language processing module 128 and/or server may generate the language processing model by any suitable method, including with limitation a natural language processing classification algorithm; language processing model may include a natural language process classification model that enumerates and/or derives statistical relationships between input terms and output terms. Algorithms to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein, are statistical models with inference algorithms that that may be applied to the models. In such models, a hidden state to be estimated may include an association between an extracted word category of a request for a behavior modification, a given relationship of such categories to expert qualities, and/or a given category of experts. There may be a finite number of category of requests for behavior modifications, a given relationship of such categories to expert qualities, and/or a given category of experts to which an extracted word may pertain; an HMM inference algorithm, such as the forward-backward algorithm or the Viterbi algorithm, may be used to estimate the most likely discrete state given a word or sequence of words. Language processing module 128 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 128 may use a corpus of documents to generate associations between language elements in a language processing module 128, and server 104 may then use such associations to analyze words extracted from one or more documents and determine that the one or more documents indicate significance of a category of requested behavior modification, a given relationship of such categories to expert qualities, and/or a given category of experts. In an embodiment, server 104 may perform this analysis using a selected set of significant documents, such as documents identified by one or more experts as representing good science, good clinical analysis, or the like; experts may identify or enter such documents via graphical user interface as described below in more detail, or may communicate identities of significant documents according to any other suitable method of electronic communication, or by providing such identity to other persons who may enter such identifications into server 104. Documents may be entered into server 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, server 104 may automatically obtain the document using such an identifier, for instance by submitting a request to a database or compendium of documents such as JSTOR as provided by Ithaka Harbors, Inc. of New York.

Continuing to refer to FIG. 1, whether an entry indicating significance of a category of behavior modification, a given relationship of such categories to expert qualities, and/or a given category of experts is entered via graphical user interface, alternative submission means, and/or extracted from a document or body of documents as described above, an entry or entries may be aggregated to indicate an overall degree of significance. For instance, each category of behavior modification, relationship of such categories to expert qualities, and/or category of experts may be given an overall significance score; overall significance score may, for instance, be incremented each time an expert submission and/or paper indicates significance as described above. Persons skilled in the art, upon reviewing the entirety of this disclosure will be aware of other ways in which scores may be generated using a plurality of entries, including averaging, weighted averaging, normalization, and the like. Significance scores may be ranked; that is, all categories of behavior modifications, relationships of such categories to expert qualities, and/or categories of experts may be ranked according significance scores, for instance by ranking categories of behavior modifications, relationships of such categories to expert qualities, and/or categories of experts higher according to higher significance scores and lower according to lower significance scores. Categories of behavior modifications, relationships of such categories to expert qualities, and/or categories of experts may be eliminated from current use if they fail a threshold comparison, which may include a comparison of significance score to a threshold number, a requirement that significance score belong to a given portion of ranking such as a threshold percentile, quartile, or number of top-ranked scores. Significance scores may be used to filter outputs as described in further detail below; for instance, where a number of outputs are generated and automated selection of a smaller number of outputs is desired, outputs corresponding to higher significance scores may be identified as more probable and/or selected for presentation while other outputs corresponding to lower significance scores may be eliminated. Alternatively or additionally, significance scores may be calculated per sample type; for instance, entries by experts, documents, and/or descriptions of purposes of a given type of test or sample collection as described above may indicate that for that type of test or sample collection a first category of behavior modification data, relationship of such category to expert qualities, and/or category of experts is significant with regard to that test, while a second category of behavior modification data, relationship of such category to expert qualities, and/or category of experts is not significant; such indications may be used to perform a significance score for each category of behavior modification data, relationship of such category to expert qualities, and/or category of experts is or is not significant per type of behavior modification sample, which then may be subjected to ranking, comparison to thresholds and/or elimination as described above.

With continued reference to FIG. 1, receiving module 108 may include first graphical user interface (GUI) 132 which may display information pertaining to at least request for a behavior modification. First GUI 132 may include without limitation, a form or other graphical element having data entry fields, where a user and/or informed advisor may enter information describing one or more requests for a behavior modification. First GUI 132 may allow for interaction between a user and system 100 to display behavior modifications.

With continued reference to FIG. 1, system 100 may include a second graphical user interface (GUI) 136 which may include without limitation a form or other graphical element having data entry fields, wherein one or more experts, including without limitation clinical and/or scientific experts, may enter information describing one or more categories of behavior modifications that experts consider to be significant as described above. In an embodiment, fields in graphical user interface may provide options describing previously identified categories, which may include a comprehensive or near-comprehensive list of types of behavior modifications; for instance in "drop-down" lists, where experts may be able to select one or more entries to indicate their usefulness and/or significance in the opinion of the experts. Fields may include free-form entry fields such as text-entry fields where an expert may be able to type or otherwise enter text, enabling expert to propose or suggest categories not currently recorded. Graphical user interface or the like may include fields corresponding to categories of experts, where experts may enter data describing categories of experts and/or qualities of experts; for instance, such fields may include drop-down lists or other pre-populated data entry fields listing currently recorded categories of experts, and which may be comprehensive, permitting each expert to select a category of expert and/or quality of expert the expert believes to be predicted and/or associated with each category behavior modification selected by the experts. Fields for entry of categories of experts and/or categories of expert qualities may include free-form data entry fields such as text entry fields; as described above, examiners may enter data not presented in pre-populated data fields in the free-form data entry fields. Alternatively or additionally, fields for entry of categories of experts may enable an expert to select and/or enter information describing or linked to a category of expert or expert quality that the expert considers significant, where significance may indicate likely impact on reversing and/or eliminating a behavior modification. Graphical user interface may provide an expert with a field in which to indicate a reference to a document describing significant categories of behavior modifications, relationships of such categories to expert categories, and/or significant categories of expert qualities. Such information may alternatively be entered according to any other suitable means for entry of expert data as described above. Data concerning significant categories of behavior modifications, relationships of such categories to expert qualities, and/or significant categories of experts may be entered using analysis of documents using language processing module 128 or the like as described above.

With continued reference to FIG. 1, system 100 includes an expert module 140 operating on the at least a server. Expert module 140 may include any suitable hardware or software module. Expert module 140 is designed and configured to generate at least an expert list 144 as a function of the at least an expert quality and the at least a request for a behavior modification, receive at least a user input as a function of the at least an expert list 144, generate at least a request for the selected expert, and transmit the at least a request for the selected expert. "Expert list" 144 as used herein is a list or similar data structure containing identifiers of experts selected by potentially matching at least an expert quality and/or at least a request for a behavior modification. Generating at least an expert list 144 may include matching at least an expert to at least an expert quality.

With continued reference to FIG. 1, expert module 140 may include expert learner 148; the expert learner 148 may be designed and configured to generate at least an expert list 144 as a function of the at least an expert quality and the at least a request for a behavior modification. Expert learner 148 may include any hardware and/or software module. Expert learner 148 may be designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, expert learner 148 may be designed and configured to generate at least an expert list 144 by creating at least a first machine-learning model 152 relating expert qualities to behavior modifications using a training set and generating at least an expert list 144 using the first machine-learning model 152; at least a first machine-learning model 152 may include one or more models that determine a mathematical relationship between expert qualities and behavior modifications. Training set includes any of the training sets as described below in more detail in reference to FIG. 5. An expert list 144 as used in this disclosure is a data structure containing a suggestion as to experts that may be able to aid a user in overcoming and/or having a particular behavior modification stabilize or go into remission. Expert list 144 may include suggested experts that may provide support, encouragement, advice, and/or services for a user. For example, expert list 144 may include a functional medicine doctor, a health coach, and an addiction specialist for a user with a pornography addiction. In yet another non-limiting example, expert list 144 may include a pastor, a church member, and a religious teach for a user with a desire to learn more about the Christian faith. Machine-learning models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, machine-learning algorithms may generate expert list 144 as a function of a classification of at least a behavior modification. Classification as used herein includes pairing or grouping behavior modifications as a function of a shared commonality. Classification may include for example, groupings, pairings, and/or trends between behavior modifications and proposed experts, future need for a particular expert, and the like. In an embodiment, machine-learning algorithms may examine relationships between a future propensity of a user to require a new expert based on current requests for behavior modifications. Machine-learning algorithms may include any and all algorithms as performed by any modules, described herein for expert learner 148. For example, machine-learning algorithms may relate a behavior modification such as a gambling addiction to a user's future propensity to require a particular expert such as a pastor or religious figure who may be able to provide moral guidance for a user with a gambling addiction. Machine-learning algorithms may examine precursor behavior modifications and future propensity to report a subsequent behavior modification. For example, machine-learning algorithms may examine a user with a behavior modification such as alcoholic addiction with a future propensity to report a subsequent behavior modification such as opioid addiction. In yet another non-limiting example, machine learning algorithms may examine varying degrees of behavior modifications. For example, machine-learning algorithms may examine a behavior modification for a food addiction with a future propensity to report a less restrictive food addiction such as a cake addiction or a soda addiction. In yet another non-limiting example, machine-learning algorithms may examine a behavior modification with a future propensity to report a more restrictive behavior modification such as a request for a behavior modification to develop a fitness regimen with a subsequent request for a request for a behavior modification to attend six fitness classes each week. Machine-learning algorithms may examine behavior modification requests by categories, such as physical addictions, personal health goals, spiritual goals, emotional addictions, psychiatric behaviors, fitness goals, and the like. For example, machine learning algorithms may examine user behavior modifications for diagnosed psychiatric conditions such as obsessive compulsive disorder (OCD), explosive personality disorder, and bipolar disorder versus behavior modifications for physical addictions such as alcohol, barbiturates, food, nicotine, pornography, and gambling. Machine-learning algorithms may examine behavior modifications among categories of users such as behavior modifications in men between the ages of 45-55 in Alaska versus user behavior modifications among females age 18-24 in Alabama. Machine-learning algorithms may examine trends among behavior modifications such as for example, a behavior modification for a benzodiazepine addiction and a subsequent alcohol addiction.

Continuing to refer to FIG. 1, machine-learning algorithm used to generate first machine-learning model 152 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, expert learner 148 may generate expert list 144 using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using a training set; the trained network may then be used to apply detected relationships between elements of behavior modifications and categories of experts and/or expert qualities.

With continued reference to FIG. 1, machine-learning algorithms may include unsupervised processes; unsupervised processes may, as a non-limiting example, be executed by an unsupervised learning module executing on server 104 and/or on another computing device in communication with server 104, which may include any hardware or software module as described as described herein. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, expert learner 148 and/or server 104 may perform an unsupervised machine learning process on training set, which may cluster data of training set according to detected relationships between elements of the training set, including without limitation correlations of behavior modifications to each other and correlations of expert qualities and/or categories of experts to each other; such relations may then be combined with supervised machine learning results to add new criteria for expert learner 148 to apply in relating at least a request for a behavior modification to an expert quality. As a non-limiting, illustrative example, an unsupervised process may determine that a first element of behavior modification data closely with a second element of behavior modification data, where the first element has been linked via supervised learning processes to a given expert quality, but the second has not; for instance, the second element may not have been defined as an input for the supervised learning process, or may pertain to a domain outside of a domain limitation for the supervised learning process. Continuing the example a close correlation between first element of behavior modification and second element of behavior modification may indicate that the second element is also a good predictor for the expert quality; second element may be included in a new supervised process to derive a relationship or may be used as a synonym or proxy for the first behavior modification.

Still referring to FIG. 1, server 104 and/or expert learner 148 may detect further significant categories of behavior modification data, relationships of such categories to expert qualities, and/or categories of experts using machine-learning processes, including without limitation unsupervised machine-learning processes as described above; such newly identified categories, as well as categories entered by experts in free-form fields as described above, may be added to pre-populated lists of categories, lists used to identify language elements for language learning module, and/or lists used to identify and/or score categories detected in documents, as described above. In an embodiment, as additional data is added to system 100, expert learner 148 and/or server 104 may continuously or iteratively perform unsupervised machine-learning processes to detect relationships between different elements of the added and/or overall data. Use of unsupervised learning may greatly enhance the accuracy and detail with which system may detect expert qualities and/or generate expert list 144.

With continued reference to FIG. 1, unsupervised processes may be subjected to domain limitations. For instance, and without limitation, an unsupervised process may be performed regarding a comprehensive set of data regarding one person, such as demographic information including age, sex, race, geographical location, profession, and the like. As another non-limiting example, an unsupervised process may be performed on data concerning a particular cohort of persons; cohort may include, without limitation, a demographic group such as a group of people having a shared age range, ethnic background, nationality, sex, and/or gender. Cohort may include, without limitation, a group of people having a shared value for an element and/or category of behavior modification data, a group of people having a shared value for an element and/or category of expert quality, and/or a group of people having a shared value and/or category of expert; as illustrative examples, cohort could include all people requesting a behavior modification such as developing a Christianity practice, all people requesting a behavior modification such as a sugar addiction, all people requesting a meditation practice or the like. Persons skilled in the art, upon reviewing the entirety of this disclosure, will be aware of a multiplicity of ways in which cohorts and/or other sets of data may be defined and/or limited for a particular unsupervised learning process.

Still referring to FIG. 1, expert learner 148 may alternatively or additionally be designed and configured to generate an expert list 144 by executing a lazy learning process as a function of the training set and the at least a request for a behavior modification; lazy learning processes may be performed by a lazy learning module executing on server 104 and/or on another computing device in communication with server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at an expert list 144 associated with a behavior modification, using training set. As a non-limiting example, an initial heuristic may include a ranking of experts contained within an expert list 144 according to relation to a test type of at least a request for a behavior modification, one or more categories of behavior modification identified in test type of at least a request for a behavior modification, and/or one or more values detected in at least a request for a behavior modification; ranking may include, without limitation, ranking according to significance scores of associations between behavior modification data and specific experts and/or categories of experts, for instance as calculated as described above. Heuristic may include selecting some number of highest-ranking associations and/or expert list 144. Expert learner 148 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate expert list 144 as described in this disclosure, including without limitation lazy learning applications of machine-learning algorithms as described in further detail below.

Continuing to refer to FIG. 1, expert learner 148 may generate a plurality of expert list 144 having different implications for a particular person. For instance, where the at least a request for a behavior modification includes a request for an addiction such as alcohol, drugs, sex, pornography, gambling, and the like, expert list 144 may be consistent with recommendations for consultation with experts including functional medicine doctors, 12-step program directors, and other addicts. In such a situation, expert learner 148 and/or server 104 may perform additional processes to resolve ambiguity. Processes may include presenting multiple possible results to a user, informing the user that one or more user preferences are needed to determine a more definite expert list 144, such as a user preference for a functional medicine approach to treatment or a peer centered approach to treatment such as a 12-step program or both. Alternatively or additionally, processes may include additional machine learning steps; for instance, where reference to a model generated using supervised learning on a limited domain has produced multiple mutually exclusive results and/or multiple results that are unlikely all to be correct, or multiple different supervised machine learning models in different domains may have identified mutually exclusive results and/or multiple results that are unlikely all to be correct. In such a situation, expert learner 148 and/or server 104 may operate a further algorithm to determine which of the multiple outputs is most likely to be correct; algorithm may include use of an additional supervised and/or unsupervised model. Alternatively or additionally, expert learner 148 may perform one or more lazy learning processes using a more comprehensive set of user data to identify a more probably correct result of the multiple results. Results may be presented and/or retained with rankings, for instance to advise a user of the relative probabilities of various expert list 144 being correct; alternatively or additionally, expert list 144 associated with a probability of correctness below a given threshold and/or expert list 144 contradicting results of the additional process, may be eliminated. As a non-limiting example, a behavior modification for a personal spiritual goal such as developing a religious practice may lead to experts such as functional medicine doctors and 12-step program directors being eliminated from an expert list 144 for a user while experts such as pastors, religious teachers, and church goers may be retained. Persons skilled in the art, upon reviewing the entirety of this disclosure, will be aware of various ways in which additional processing may be used to determine relative likelihoods of experts on a list of experts, and/or to eliminate some experts from such a list. Expert list 144 may be provided to a user such as at user client device 112 and/or advisor client device 116.

With continued reference to FIG. 1, expert module 140 may include expert database. Expert database 156 may include any database or datastore suitable for use as language database 124 as described above. Expert database 156 may include one or more categories of experts as described in more detail below. Expert database 156 may include a table containing information such as one or more qualities of a particular expert or category of expert. Expert learner 148 may consult expert database 156b to generate expert list 144. For example, expert learner 148 may consult expert database 156b to match a particular expert and/or category of expert to an expert quality. Matching may include selecting an expert that exhibits a particular quality. For example, an expert such as a 12-step member attendee may be matched to a quality such as self-control and positive influence. Matching may include selecting an expert that does not exhibit an undesirable quality. For example, an expert such as a functional medicine doctor may be matched as an expert if the functional medicine doctor does not exhibit qualities such as sexual immorality or debauchery.

Qualities as to an expert may be collected and stored in expert quality database 160 which may be located within expert module 140. Qualities of at least an expert may be self-reported, such as a when at least an expert may enter information about himself or herself into system 100 such as at first GUI 132 and/or second GUI 136. For example, at least an expert who has been faithful to one's spouse may self-report a quality such as faithfulness and joy. At least an expert who has had affairs and sexual impurity may self-report a quality such as sexual immorality. In an embodiment, at least an expert may self-report a quality on a scale of how often they may exhibit a certain quality. For example, a scale may include categories describing how often an expert exhibits a quality such as a category of "never" when an expert never exhibits a quality, a category such as "rarely" when an expert may infrequently exhibit a quality, a category such as "sometimes" when an expert may exhibit a quality more frequency, a category such as "frequently" when an expert is repeatedly exhibiting a quality, and a category such as "always" when an expert is consistently exhibiting a quality. In an embodiment, qualities may be reported about an expert by an expert's network which may include an expert's family, friends, acquaintances, and other users an expert has provided support to. For example, a user that an expert helped achieve a behavior modification such as recovering from alcohol addiction may rate and provide an input as to qualities that expert may possess and/or exhibit. In such an instance, user may report to system 100 that expert exhibited qualities such as patience, kindness, and self-control. Qualities as reported by an expert's network may also be ranked on a scale as described above as to how often an expert exhibits a quality. Qualities of at least an expert may also be obtained and stored in a database from an expert's self-reflection of qualities expert may exhibit. Qualities stored in a database as to an expert may be aggregated together when results are received from different evaluators. Qualities stored in a database may be frequently updated to reflect different qualities an expert may exhibit, and/or different frequencies that an expert may exhibit a quality. For example, an expert who sometimes exhibits joy, may frequently experience joy after a personal achievement such as graduation from culinary school and landing a dream job and as such database may be updated to reflect this. In yet another non-limiting example, an expert who frequently exhibits drunkenness and then enters rehab and recovers may have database updated to reflect that expert never experiences drunkenness anymore.

With continued reference to FIG. 1, selecting at least an expert may include producing a field of combinations of experts and selecting at least an expert using a lazy-learning process. Lazy-learning process may include any of the lazy-learning process as described above. Lazy-learning process may include for example, k-nearest neighbors algorithm, a lazy naïve Bayes algorithm, or the like; persons skilled in the art, upon reviewing the entirety of this disclosure, will be aware of various lazy-learning algorithms that may be applied. Lazy-learning process may include a continuously updating mathematical expression such as continuously updating training sets with new entries based on one or more user entries. User entries may update mathematical expressions, and subsequently be utilized to generate a new training set to modify the new expression. In an embodiment, lazy-learning process may include performing a k-nearest neighbors algorithm, so as to predict the classification of a new sample point based on already known data or training data. In an embodiment, k-nearest neighbors algorithm may assign a weighted contribution of each neighbor, so that nearer neighbors contribute more to the average than the more distant ones. For example, a weighting scheme may include giving each neighbor a weight of 1/d where d is the distance to the neighbor. The neighbor may include a set of data for which the class is known, such as training data. In an embodiment, k-nearest neighbors algorithm may include using training data such as vectors in a multidimensional space, each containing a class label. The training data initially used to generate the k-nearest neighbors algorithm may include a first training set that includes the vector and correlated class label. In an embodiment, subsequent data may be classified during the classification phase, whereby k is a user-defined constant based on the first training set and a subsequent unlabeled vector is classified by assigning a class label that is most frequent among the k training samples nearest to that vector space. In an embodiment, vector space may be measured using Euclidean distance. In an embodiment, classification accuracy calculations based on k values may be updated using algorithms including Large Margin Nearest Neighbor and/or Neighborhood components analysis. In an embodiment, neighbors may be selected using brute force calculated based on Euclidean distance from point of interest whose class label is unknown to points contained within training set. Distance may also be measured utilizing other norms including for example cosine similarity between vectors. In an embodiment, neighbors may be selected utilizing tree like data structures to determine distances from points of interest to points contained within training sets. In an embodiment, distances may be computed by plotting in "n-dimensional" space as defined by any suitable coordinate system including without limitation Cartesian and polar, an n-dimensional vector space, or the like, where points represent data values.

With continued reference to FIG. 1, k-nearest neighbors algorithms may select k values with varying values. Larger values of k may reduce the effect of noise on classification of neighbors while making explicit boundaries between classes less distinct. K values may be calculated utilizing heuristic techniques including hyperparameter optimization. K values may be calculated utilizing bootstrapping methods.

With continued reference to FIG. 1, classification utilizing k-nearest neighbor algorithms may be useful to select optimal experts based on weighted contributions of datasets containing experts and expert qualities. Distances between known datasets may be utilized to label subsequent datasets including experts and expert qualities utilizing any of the methodologies as described herein. Such calculations may aid in selecting optimal experts.

With continued reference to FIG. 1, selecting at least an expert may include generating a loss function of user specific qualities and minimizing the loss function. In an embodiment, expert module 140 may compare one or more expert options and one or more expert qualities to a mathematical expression representing an optimal combination of user entered variables. Mathematical expression may include a linear combination of variables, weighted by coefficients representing relative importance of each variable in selecting an optimal expert exhibiting an optimal quality and/or not exhibiting unfavorable qualities. For instance, a variable such as exhibiting a quality such as having patience may be multiplied by a first coefficient representing the importance of having patience, a second variable such as having a faith based practice may be multiplied by a second coefficient representing the importance of having a faith based practice, a degree of variance from a quality such as not self-seeking may be represented as another parameter, which may be multiplied by an additional coefficient representing an importance of that variable; persons skilled in the art, upon reviewing the entirety of this disclosure, will be aware of different variables that may be weighted by various coefficients. Use of a linear combination is provided only as an illustrative example; other mathematical expressions may alternatively or additionally be used, including without limitation higher-order polynomial expressions or the like.

With continued reference to FIG. 1, mathematical expression may represent a loss function, where a "loss function" is an expression of an output of which an optimization algorithm minimizes to generate an optimal result. As a non-limiting example, expert module 140 may calculate variables of each of a plurality of experts and/or expert qualities, calculate an output of mathematical expression using the variables, and select an expert that produces an output having the lowest size, according to a given definition of "size" of the set of outputs representing each of the plurality of experts; size may, for instance, include absolute value, numerical size, or the like. Selection of different loss functions may result in identification of different expert list 144 and generating minimal outputs; for instance, where having patience is associated in a first loss function with a large coefficient or weight, having faith is associated with a small coefficient or weight, may minimize the first loss function, whereas a second loss function wherein having patience has a smaller coefficient but degree of variance from having faith has a larger coefficient may produce a minimal output for a different expert list 144 and having more importance on having patience but more closely hewing to having faith.

Alternatively or additionally, and still referring to FIG. 1, each expert list 144 may be represented by a mathematical expression having the same form as mathematical expression; expert module 140 may compare different expert list 144 using an error function representing average difference between the two mathematical expressions. Error function may, as a non-limiting example, be calculated using the average difference between coefficients corresponding to each variable. Expert list 144 having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers.

Still referring to FIG. 1, mathematical expression and/or loss function may be provided by receiving one or more user commands. For instance, and without limitation, a graphical user interface may be provided to user with a set of sliders or other user inputs permitting a user to indicate relative and/or absolute importance of each variable to the user. Sliders or other inputs may be initialized prior to user entry as equal or may be set to default values based on results of any machine-learning processes or combinations thereof as described in further detail below. In an embodiment, a user specific variable may include a faith based quality such as for example, an expert who practices the Christian based faith.

With continued reference to FIG. 1, mathematical expression and/or loss function may be generated using a machine learning to produce loss function: i.e., regression. Mathematical expression and/or loss function be user-specific, using a training set composed of past user selections; may be updated continuously. Mathematical expression and/or loss function may initially be seeded using one or more user entries as above. User may enter a new command changing mathematical expression, and then subsequent user selections may be used to generate a new training set to modify the new expression.

With continued reference to FIG. 1, mathematical expression and/or loss function may be generated using machine learning using a multi-user training set. Training set may be created using data of a cohort of persons having similar demographic, religious, health, behavior modification requests, and/or lifestyle characteristics to user. This may alternatively or additionally be used to seed a mathematical expression and/or loss function for a user, which may be modified by further machine learning and/or regression using subsequent user selections of experts, expert list 144, and/or expert qualities.

With continued reference to FIG. 1, selecting at least an expert may occur as a function of a user entered category of at least an expert. Category may include a class of individuals having shared characteristics. Category may include shared characteristics as to function that at least an expert may perform. For example, a user may request a category of at least an expert such as a functional medicine doctor, a family member, a friend, a member of the community and the like. Category of at least an expert may be categorized into sub-categories. For example, a category such as a functional medicine doctors may include primary care functional medicine doctors, gastrointestinal functional medicine doctors, psychiatric functional medicine doctors, dermatology functional medicine doctors and the like. In yet another non-limiting example, a category such as friends may be categorized into sub-categories which may include friends from childhood, friends from college, friends from work, friends from health club, friends from an activity such as an organized sport, friends from a support group, friends from a neighborhood and the like.

With continued reference to FIG. 1, expert module may receive at least a user input selected at least a selected expert as a function of the expert list. User input, as used herein may include any user data including for example a user preference for at least an expert or a user dislike for at least an expert. User input containing the at least a selected expert may be utilized by expert module to generate at least a request for the at least a selected expert.

With continued reference to FIG. 1, system 100 includes a client-interface module 164. Client-interface module 164 may include any suitable hardware or software module. Client-interface module 164 may be designed and configured to transmit the at least a request for the selected expert to an expert. In an embodiment, client-interface module 164 may transmit the at least a request for the selected expert to a user client device 112 operated by the selected expert and/or to an advisor client device 116 operated by the selected expert.

With continued reference to FIG. 1, system 100 may include at least an advisory module 168 executing on the at least a server 104. At least an advisory module 168 may include any suitable hardware or software module. In an embodiment, at least an advisory module 168 may be designed and configured to receive at least a request for an advisory input, generate at least an advisory output using the at least a request for an advisory input, select at least an advisor client device 116 as a function of the at least a request for an advisory input and transmit the at least an advisory output to the at least an advisor client device 116. An advisory client device may include any of the advisor client devices 116 as described above and may be operated by an informed advisor. An informed advisor may include, without limitation, a medical professional such as a doctor, nurse, nurse practitioner, functional medicine practitioner, any professional with a career in medicine, nutrition, genetics, fitness, life sciences, insurance, and/or any other applicable industry that may contribute information and data to system 100 regarding medical needs. An informed advisor may include a spiritual or philosophical advisor, such as a religious leader, pastor, imam, rabbi, or the like. An informed advisor may include a physical fitness advisor, such as without limitation a personal trainer, instructor in yoga or martial arts, sports coach, or the like.

Figure 2:
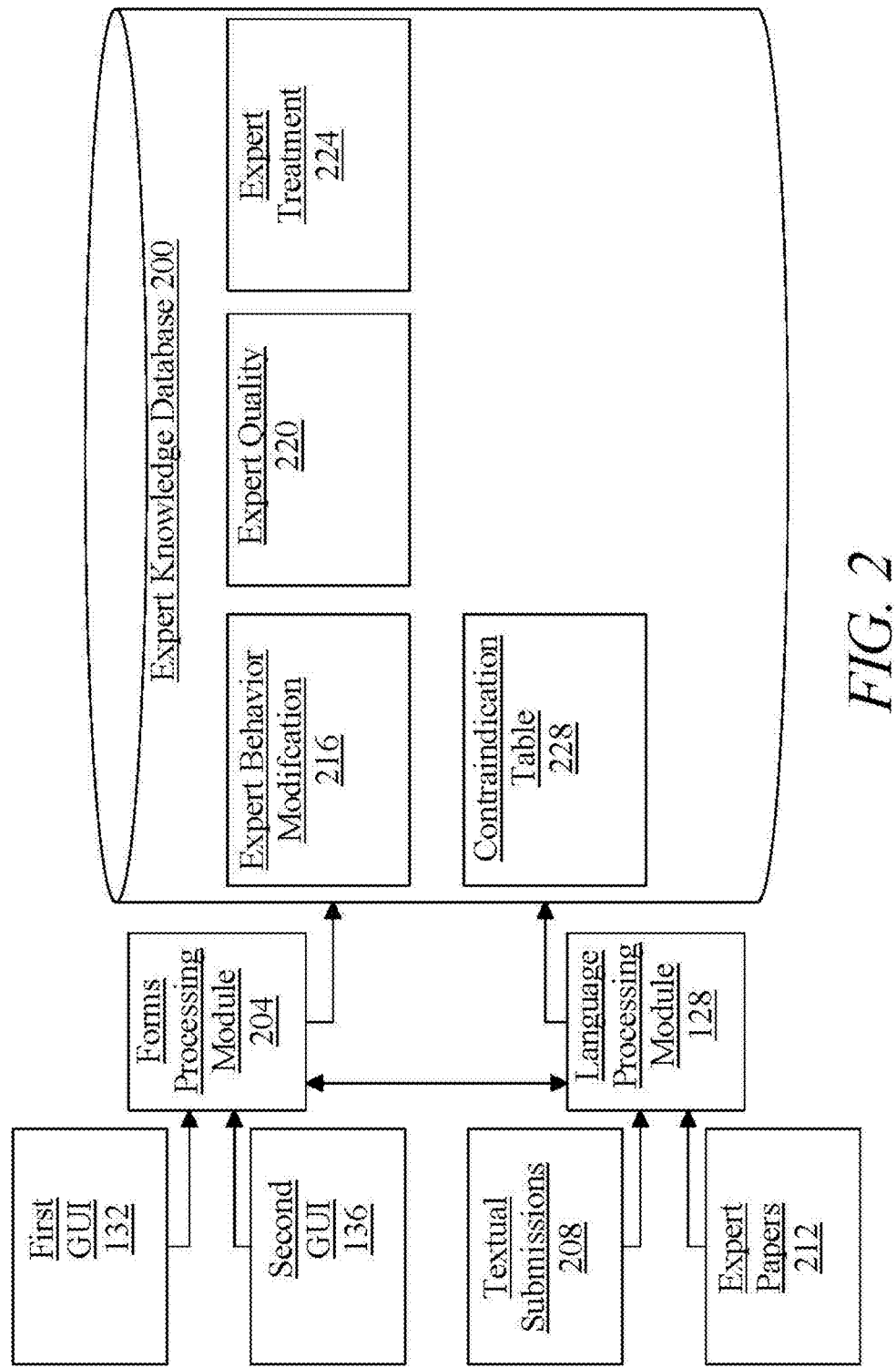
FIG. 2 is a block diagram illustrating an exemplary embodiment of an expert knowledge database.

Referring now to FIG. 2, an exemplary embodiment of an expert knowledge database is illustrated. Expert knowledge database 200 may, as a non-limiting example, organize data stored in the expert knowledge database 200 according to one or more database tables. One or more database tables may be linked to one another by, for instance, common column values. For instance, a common column between two tables of expert knowledge database 200 may include an identifier of an expert submission, such as a form entry, textual submission, expert paper, or the like, for instance as defined below; as a result, a query may be able to retrieve all rows from any table pertaining to a given submission or set thereof. Other columns may include any other category usable for organization or subdivision of expert data, including types of expert data, names and/or identifiers of experts submitting the data, times of submission, or the like; persons skilled in the art, upon reviewing the entirety of this disclosure, will be aware of various ways in which expert data from one or more tables may be linked and/or related to expert data in one or more other tables.

Still referring to FIG. 2, a forms processing module 204 may sort data entered in a submission via first graphical user interface 120 by, for instance, sorting data from entries in the first graphical user interface 120 to related categories of data; for instance, data entered in an entry relating in the first graphical user interface 120 to a behavior modification may be sorted into variables and/or data structures for storage of behavior modifications, while data entered in an entry relating to a category of expert quality and/or an element thereof may be sorted into variables and/or data structures for the storage of, respectively, categories of expert qualities or elements of expert qualities. Where data is chosen by an expert from pre-selected entries such as drop-down lists, data may be stored directly; where data is entered in textual form, language processing module 128 may be used to map data to an appropriate existing label, for instance using a vector similarity test or other synonym-sensitive language processing test to map behavior modification data to an existing label. Alternatively or additionally, when a language processing algorithm, such as vector similarity comparison, indicates that an entry is not a synonym of an existing label, language processing module may indicate that entry should be treated as relating to a new label; this may be determined by, e.g., comparison to a threshold number of cosine similarity and/or other geometric measures of vector similarity of the entered text to a nearest existent label, and determination that a degree of similarity falls below the threshold number and/or a degree of dissimilarity falls above the threshold number. Data from expert textual submissions 208, such as accomplished by filling out a paper or PDF form and/or submitting narrative information, may likewise be processed using language processing module 128. Data may be extracted from expert papers 212, which may include without limitation publications in medical and/or scientific journals, by language processing module 128 via any suitable process as described in this disclosure. Persons skilled in the art, upon reviewing the entirety of this disclosure, will be aware of various additional methods whereby novel terms may be separated from already-classified terms and/or synonyms therefore, as consistent with this disclosure. Expert knowledge database 200 may include a single table and/or a plurality of tables; plurality of tables may include tables for particular categories of data labels such as a current expert behavior modification table, expert quality table, expert treatment table, and counterindication table to name a few non-limiting examples presented for illustrative purposes only.

With continued reference to FIG. 2, expert knowledge database table 200 may be implemented as any database and/or datastore suitable for use as language database described below in reference to FIG. 3. One or more database tables in expert knowledge database table 200 may include expert behavior modification table 216; expert behavior modification table 216 may include behavior modifications compiled and/or categorized according to experts such as medical doctors, scientists, researchers, and the like. One or more database tables in expert knowledge database table 200 may include expert quality table 220; expert quality table 220 may include expert qualities desirable for an expert associated with a particular behavior modification. For example, an expert helping a user overcome a heroin addiction may need to exhibit qualities such as trustworthiness, accountability, and reliability, while an expert helping a user lose weight may need to exhibit qualities such as persistence, mental fortitude, and responsibility. One or more database tables in expert knowledge database 200 may include expert treatment table 224; expert treatment table 224 may include treatments correlated to behavior modifications and experts who may aid in such treatments. For example, expert treatment table 224 may include information such as what experts may be useful for a user with a behavior modification such as smoking cessation which may include experts such as functional medicine doctors, addiction specialists, friends, and family members. In yet another non-limiting example, expert treatment table 224 may include information such as what experts may be useful for a user with a behavior modification to have more energy throughout the day with experts that may include a fitness coach, a personal trainer, friends, and family members. One or more database tables in expert knowledge database 200 may include contraindication table 228; contraindication table 228 may include information pertaining to experts, categories of experts, and/or qualities that may be contraindicated for a particular behavior modification. For example, a behavior modification such as alcohol addition may have a contraindication label for an expert with a quality such as drunkenness or unaccountability.

Figure 3:
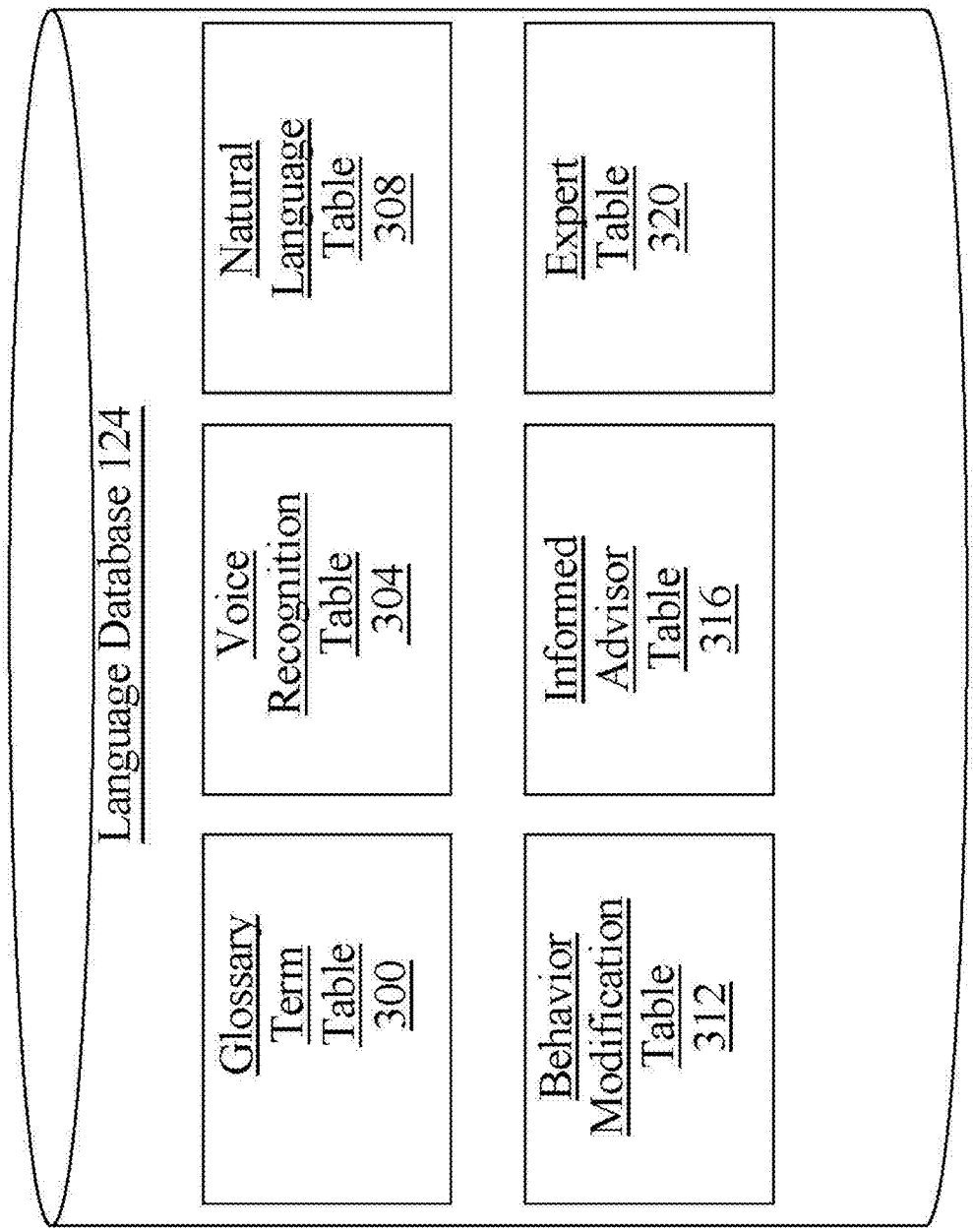
FIG. 3 is a block diagram illustrating an exemplary embodiment of a language database.

Referring now to FIG. 3, an exemplary embodiment of language database 124 is illustrated. Language database 124 may be implemented as any database and/or datastore suitable for use as a database. One or more database tables in language database may include glossary term table 300. Glossary term table 300 may contain terms and commands that may be specific to at least a request for a behavior modification. Glossary term table 300 may contain terms and commands that may be specific to a particular user and/or group of users. For example, glossary term table 300 may contain a definition for what addiction means for a user with an alcohol addiction versus what addiction means for a user with a shopping addiction. Language database 124 may include voice recognition table 304 that may identify spoken commands and associates spoken commands with a user. Voice recognition table 304 may be utilized such as when a user and/or expert interfaces with first GUI 132 and/or second GUI 136 through a voice to text option. For example, voice recognition table 304 may be utilized when a user generates at least a request for a behavior modification such as "stop eating products containing sugar" to associate a user who commands such a behavior modification with Sally based on voice recognition of Sally's voice. This may assist a user in having control over generating commands so that users do not impersonate one another. Language database 124 may include a natural language table 308 which may contain information pertaining to meaning of common language terms used in general conversations. In an embodiment, natural language table 308 may comprise multiple specialized, plurally accessible library-type databases. Natural language table 308 may be utilized to understand the contents of the at least a request for a behavior modification. Language database 124 may include behavior modification table 312 which may contain information pertaining to terms, conditions, and commands that may be specific to a particular request for a behavior modification. For example, at least a request for a behavior modification such as "eliminate sugar from diet for weight loss" may be associated with all forms of bad sugars such as sucrose found in dietary items such as soda, candy and sweets. At least a request for a behavior modification such as "eliminate sugar from diet for Candida overgrowth" may be associated with different types of sugars including not just sugar found in dietary items such as soda, candy, and sweets, but also sugar found in fruits, condiments, salad dressing, vinegars, and the like. Language database 124 may include an informed advisor table 316 which may contain information such as words and requests contained within a particular behavior modification request that may require the attention of an informed advisor. For example, requests that contain terms such as "suicidal" or "depression" may be associated with an informed advisor such as a function medicine doctor while requests that contain terms such as sports and particular weights may be associated with an informed advisor such as a personal trainer. Language database 124 may include expert table 320 which may include terms and commands that may be specific to a particular expert. For example, an expert such as an alcoholics anonymous support group may be associated with certain words, phrases, and meaning of such words such as meeting, drink, sobriety, A.A., and the like.

Figure 4:
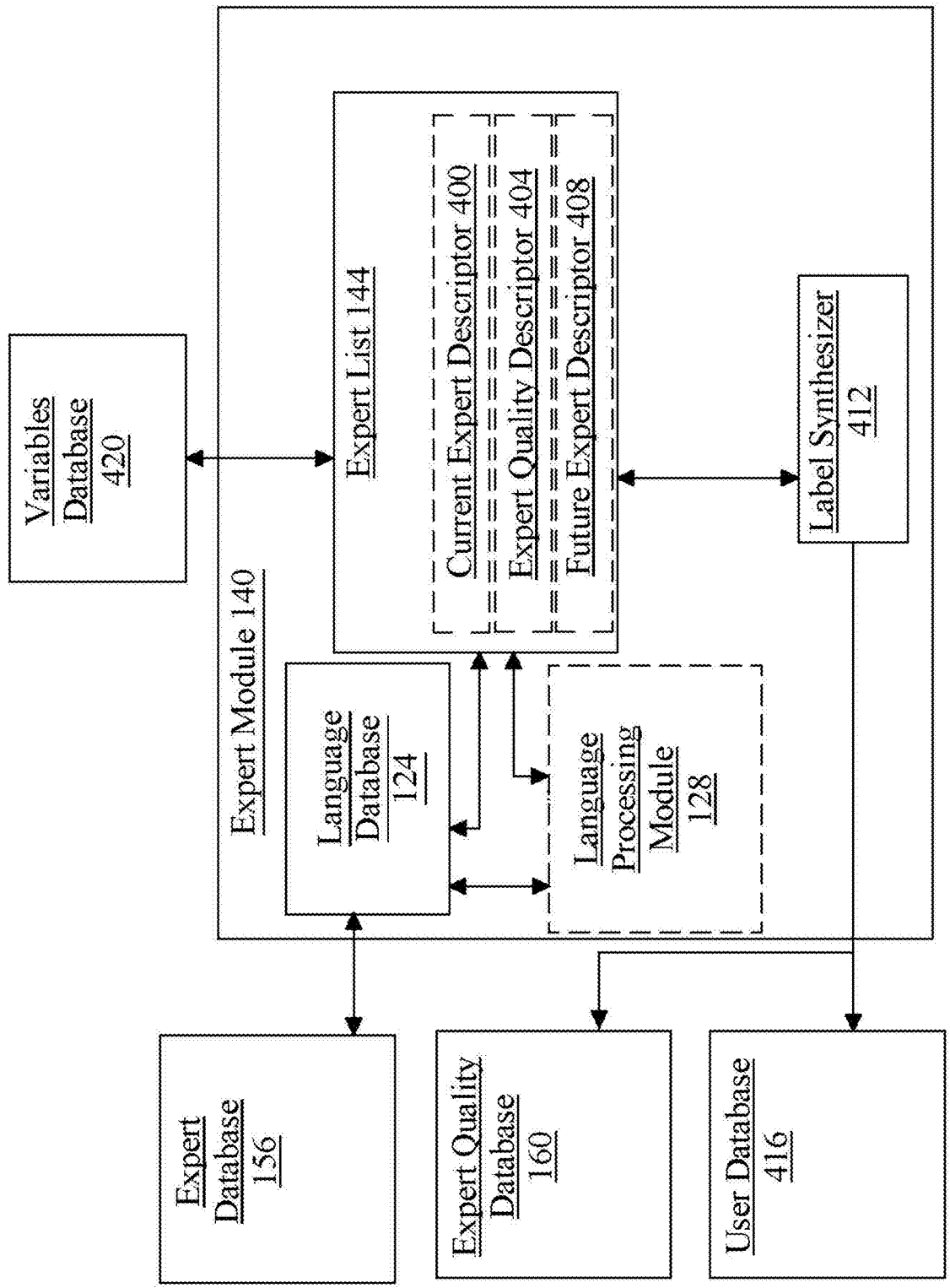
FIG. 4 is a block diagram illustrating an exemplary embodiment of an expert module and associated system elements.

Referring now to FIG. 4, an exemplary embodiment of expert module 140 is illustrated. Expert list 144 may include a current expert descriptor 400 which as used in this disclosure is an element of data describing current experts recommended as a function of the at least a request for a behavior modification. Expert module 140 may produce current expert descriptor 400 using at least a request for a behavior modification. Expert list 144 may include an expert quality descriptor 404 which as used in this disclosure is an element of data describing at least a quality portrayed and/or exhibited by at least an expert contained on expert list 144. For example, an expert quality descriptor 404 may include an expert quality descriptor 404 such as "not rude" for an expert who would be described as courteous, kind, and gracious by any person that expert may meet or interact with. In yet another non-limiting example, at least a quality descriptor 404 may include an expert quality descriptor 404 such as "always trusts" for an expert who always has complete trust in God in all things that the expert may do, such as believing in God's promises and praying that all things work for good. Expert module 140 may produce future expert descriptor 408 which as used in this disclosure is an element of data describing at least a future expert that may be helpful to a user as a function of a request for a behavior modification. For example, a user with a request for a behavior modification such as alcohol addiction may receive an expert list 144 containing a current expert descriptor 400 such as a functional medicine doctor while the user goes through alcohol detoxification such as in a hospital or rehab setting, and expert list 144 may contain a future expert descriptor 408 that contains a suggestion for a sponsor in a 12-step program after user has become abstinent from alcohol. In an embodiment, expert module 140 may include a label synthesizer 412. Label synthesizer 412 may include any suitable software or hardware module. In an embodiment, label synthesizer 412 may be designed and configured to combine a plurality of labels in an expert list 144 to provide maximally efficient data presentation. Combination of labels may include elimination of duplicate information. For example, label synthesizer 412 may be configured to determine that a first expert contained within current expert descriptor 400 is a duplicate of a second expert contained within future expert descriptor 408. Determination that a first expert is a duplicate of a second expert may include determining that the first expert is identical to the second expert; for instance a first expert linked to a first behavior modification request may be identical to a second expert linked to a second behavior modification request. In an embodiment, expert module 140 may consult expert database 156 for identifying information pertaining to a particular expert to determine if first expert may be identical to second expert such as by verifying expert's address, phone number, birthday, or any other identifying information that may be contained within expert database. As a further non-limiting example, a first expert may be synonymous with a second expert where detection of synonymous experts may be performed without limitation by language processing module 128.

With continued reference to FIG. 4, expert module 140 may generate at least an expert list 144 by converting one or more requests for behavior modification into natural language. As a non-limiting example, expert database 156 may include language database, which may be configured to determine an element of natural language associated with at least a request for a behavior modification. Expert module 140 may implement this, without limitation, by using language processing module 128 to detect one or more associations between at least a request for a behavior modification and phrases and/or statements of natural language. Alternatively or additionally, expert module 140 may retrieve one or more elements of natural language from language database, which may contain one or more tables associating behavior modification requests and/or groups of behavior modification requests with words, sentences, and/or phrases of natural language. One or more elements of natural language may be included in expert list 144 for instance to display to a user as text a current expert list 144 and/or associated qualities with the expert.

With continued reference to FIG. 4, language synthesizer 412 may group experts and/or expert qualities according to one or more one or more classification systems relating experts and/or expert qualities to one another. For example, qualities such as patience, not rude, and calmness may be grouped together under a category such as not easily angered while rejoicing with the truth, faithfulness, and hopefully may be grouped together under a category such as trustworthiness. In yet another non-limiting example, experts may be grouped together as to exhibited qualities and behavior modifications, whereby an expert who exhibits qualities such as compassion and honesty may be grouped under behavior modifications such as food addiction and initiating a fitness regimen. In an embodiment, an expert and/or expert quality may belong to a plurality of overlapping categories. Expert module 140 may be configured to add a category label associated with a shared category to expert list 144, where addition of the label may include addition of the label and/or a datum linked to the expert list 144, such as a textual or narrative description. In an embodiment, relationships between experts and categories and/or qualities and categories may be contained within expert database 156 and/or qualities database.

Figure 5:
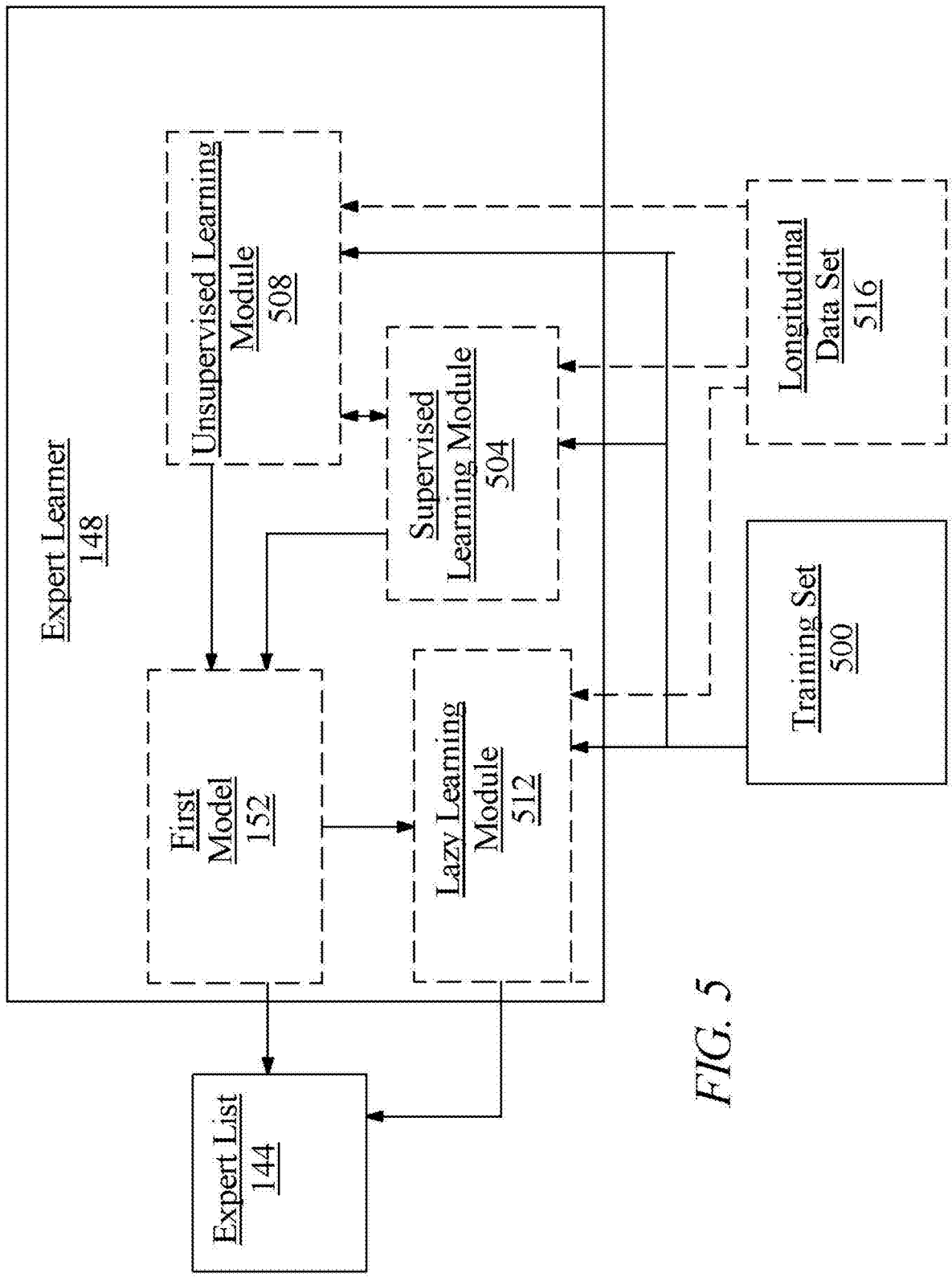
FIG. 5 is a block diagram illustrating an exemplary embodiment of an expert learner and associated system elements.

Referring now to FIG. 5, an exemplary embodiment of expert learner 148 is illustrated. Expert learner 148 may be designed and configured to receive training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 5, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

With continued reference to FIG. 5, expert learner 148 may be configured to receive a training set 500 including a plurality of first data entries, each first data entry of the training set 500 including at least an element of behavior modification data and at least a correlated expert and/or expert quality. Behavior modification data may include any data indicative of a behavior modification. Behavior modification data may include data surrounding physical addictions to substances such as alcohol, tobacco, opioids, prescription drugs, cocaine, cannabis, amphetamines, hallucinogens, inhalants, phencyclidine and the like. Behavior modification data may include data concerning impulse control disorders such as intermittent explosive disorder, kleptomania, pyromania, gambling and the like. Behavior modification data may include data surrounding addictions to certain actions such as food, sex, pornography, computer use, device use such as cellphones, tablets, and the like; work, exercise, spiritual obsession, pain seeking, cutting, shopping and the like. Behavior modification data may include data concerning a trait one may exhibit in personal relationships at home, work, or school such as winning too much, passing judgment, making destructive comments, speaking when angry, extreme negativity, withholding information, making excuses, clinging to the past, playing favorites, failing to listen, failing to express gratitude, and the like. Behavior modification data may include data associated with behaviors including thoughts, words, actions and deeds such as sexual immorality including impurity, orgies, and lust, idolatry including witchcraft, selfish ambition, demons, and demigods, debauchery including drunkenness, filthy language, and corruption, hatred including malice, deceit, and fits of rage, jealousy including envy, anger, greed and slander and/or perceptions thereof. Behavior modification data may include data describing a trait a user may exhibit surrounding one's lifestyle such as a desire to lose weight, a desire to develop a spirituality practice, attend training sessions at a gym more frequently, develop a meditation practice, meet with a nutrition professional to discuss meal plans and the like. Behavior modification may data include data about a trait a user seeks to attain. Behavior modification data may include self-reported behavior modification data and/or behavior modification data reported from a third party such as from an informed advisor such as a functional medicine doctor. Behavior modification may include a request and/or desire to modify a behavior. Correlated expert and/or expert quality may include data surrounding experts and/or qualities of experts that may useful to aid a user with a particular behavior modification. For example, a behavior modification such as alcohol detoxification for an alcoholic may be correlated to an expert such as a functional medicine doctor while a behavior modification such as maintaining alcohol sobriety for a user after alcohol detoxification may be correlated to an expert such as a sponsor in alcoholics anonymous. In yet another non-limiting example, a behavior modification such as weight loss may be correlated to an expert quality such as reliability and accountability.

With continued reference to FIG. 5, training data may be stored in any suitable data and/or data type. For instance, and without limitation, training data may include textual data such as numerical, character, and/or string data. Textual data may include a standardized name and/or code for a behavior modification including for example a diagnostic code for a diagnosed behavior modification such as opioid addiction such as The International Statistical Classification of Diseases and Related Health Problems (ICD). In general there is no limitation on forms textual data or non-textual data used as training data may take; persons skilled in the art, upon reviewing the entirety of this disclosure, will be aware of various forms which may be suitable for use as training data consistent with this disclosure.

With continued reference to FIG. 5, in each first data element of training data, at least a first element of behavior modification data is correlated with at least an element of expert and/or expert quality data. In an embodiment, an element of behavior modification data is correlated with at least an element of expert data where the element of behavior modification data is located in the same data element and/or portion of data element as the expert data; for example, and without limitation, an element of behavior modification is correlated with an element of expert data where both element of behavior modification data and expert data are contained within the same first data element of training set 500. As a further example, an element of behavior modification data is correlated with an element of expert data where both share a category label such as where each is within a certain distance of the other within an ordered collection of data in data element, or the like. In an embodiment, an element of behavior modification data is correlated with an element of expert data where the behavior modification data and expert data share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between behavior modification data and expert data and/or expert quality data that may exist in training set 500 and/or first data element consistently with this disclosure.

With continued reference to FIG. 5, machine-learning algorithms used by expert learner 148 may include supervised machine-learning algorithms, which may, as a non-limiting example be executed using a supervised learning module 504 executing on expert module 140 and/or on another computing device in communication with expert module 140, which may include any hardware or software module. Supervised machine learning algorithms, as defined herein, include algorithms that receive a training set 500 relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use elements of behavior modification data as inputs, experts and/or expert qualities as outputs, and a scoring function representing a desired form of relationship to be detected between elements of behavior modification data and experts and/or expert qualities; scoring function may, for instance, seek to maximize the probability that a given element of behavior modification data and/or combination of elements of behavior modification data is associated with a given expert, combination of experts, and/or expert qualities to minimize the probability that a given element of behavior modification data and/or combination of elements of behavior modification data is not associated with a given a given expert, combination of experts, and/or expert qualities. Scoring function may be expressed as a risk function representing an "expected loss" of an algorithm relating inputs to outputs, where loss is computed as an error function representing a degree to which a prediction generated by the relation is incorrect when compared to a given input-output pair provided in training set 500. Persons skilled in the art, upon reviewing the entirety of this disclosure, will be aware of various possible variations of supervised machine learning algorithms that may be used to determine relation between elements of behavior modification data and experts and/or expert qualities. In an embodiment, one or more supervised machine-learning algorithms may be restricted to a particular domain for instance, a supervised machine-learning process may be performed with respect to a given set of parameters and/or categories of parameters that have been suspected to be related to a given set of behavior modifications, and/or are specified as linked to a particular expert and/or category of expert covering a particular set of behavior modifications. As a non-limiting example, a particular set of experts such as 12-step program participants may be typically used by behavior modifications relating to addictions, and a supervised machine-learning process may be performed to relate those 12-step program participants to the various different types of addictions; in an embodiment, domain restrictions of supervised machine-learning procedures may improve accuracy of resulting models by ignoring artifacts in training data. Domain restrictions may be suggested by experts and/or deduced from known purposes for particular categories and/or groups such as sub-sets of addiction including alcohol, drugs, shopping, gambling, sex, pornography, eating, and the like. Additional supervised learning processes may be performed without domain restrictions to detect, for instance, previously unknown and/or unsuspected relationships between behavior modification data and experts and/or expert qualities.

With continued reference to FIG. 5, expert learner 148 may perform one or more unsupervised machine-learning processes as described above; unsupervised processes may be performed by an unsupervised learning module 508 executing on expert module 140 and/or on another computing device in communication with expert module 140, which may include any hardware or software module. For instance, and without limitation, expert learner 148 may perform an unsupervised machine learning process on training set 500, which may cluster data of second training set 500 according to detected relationships between elements of the training set 500, including without limitation correlations of behavior modifications to each other and correlations of experts and/or expert qualities to each other; such relations may then be combined with supervised machine learning results to add new criteria for expert learner 148 to apply in relating behavior modifications to experts and/or expert qualities. As a non-limiting, illustrative example, an unsupervised process may determine that a first behavior modification correlates closely with a second behavior modification, where the first behavior modification has been linked via supervised learning processes to a given expert, but the second has not; for instance, the second behavior modification may not have been defined as an input for the supervised learning process, or may pertain to a domain outside of a domain limitation for the supervised learning process. Continuing the example, a close correlation between first behavior modification and second behavior modification may indicate that the second behavior modification is also a good match for the expert; second behavior modification may be included in a new supervised process to derive a relationship or may be used as a synonym or proxy for the first behavior modification by expert learner 148. Unsupervised processes performed by expert learner 148 may be subjected to any domain limitations as described above.

Still referring to FIG. 5, expert learner 148 may detect further significant categories of behavior modifications, relationships of such categories to experts, and/or categories of expert qualities using machine-learning processes, including without limitation unsupervised machine-learning processes as described above; such newly identified categories, as well as categories entered by experts in free-form fields as described above, may be added to pre-populated lists of categories, lists used to identify language elements for language database, and/or lists used to identify and/or score categories detected in documents, as described above. In an embodiment, as additional data is added to system 100, expert module 140 may continuously or iteratively perform unsupervised machine-learning processes to detect relationships between different elements of the added and/or overall data; in an embodiment, this may enable system 100 to use detected relationships to discover new correlations between known behavior modifications, experts, and/or qualities of experts and one or more elements of data in large bodies of data, such as addiction data, fitness data, nutrition data, and thus enabling future supervised learning and/or lazy learning processes to identify relationships between, e.g., particular clusters of behavior modifications, experts, and/or qualities of experts. Use of unsupervised learning may greatly enhance the accuracy and detail with which system may generate expert list 144.

With continued reference to FIG. 5, expert list 144 may be generated based on classification of the at least a behavior modification. Classification as used herein includes pairing or grouping of behavior modifications as a function of some shared commonality. Behavior modifications may be grouped with certain health goals such as weight loss, food addiction, and physical inactivity which may generate an expert list 144 that contain an expert such as a nutritionist or fitness instructor. Behavior modifications grouped with certain alarm conditions such as depression, drug addiction, alcohol addiction may generate an expert list 144 that includes consultation with a functional medicine doctor. Expert list 144 may be generated based on groupings such as severity of behavior modification. For example, a user with a behavior modification such as a desire to drink less soda throughout the week may be linked to an expert list 144 that includes a support system of family, friends, and co-workers while a user with a behavior modification such as heroin addiction may be linked to an expert list 144 that includes trained medical professionals including functional medicine doctors, nurses, and addiction specialist. Classification of at least a behavior modification may include staging of a behavior modification. Staging may include dividing a behavior modification or goal into categories on a spectrum of behaviors and symptomology. For example, a user with a behavior modification such as attending church once each week may require experts such as friends and family members and fellow church-goers while a user with a behavior modification such as developing a Christian faith practice may require experts such as members of clergy, religious teachers, religious instructors, in addition to friends, family members, and fellow church-goers. Expert list 144 may be generated by any of the methodologies as described in this disclosure.

Continuing to view FIG. 5, expert learner 148 may be configured to perform a lazy learning process as a function of the training data and the at least a request for a behavior modification to produce the expert list 144; a lazy learning process may include any lazy learning process as described above. Lazy learning processes may be performed by a lazy-learning module 512 executing on expert module 140 and/or on another computing device in communication with expert module 140, which may include any hardware or software module. Expert list 144 may be provided to a user client device 112 including any of the user client devices 112 described herein.

In an embodiment, and still referring to FIG. 5, expert learner 148 may generate a plurality of expert list 144 having different implications for a particular person. For instance, where a behavior modification indicates that a person has a pornography addiction, various experts may be generated within expert list 144 associated with helping the user enter remission for the behavior modification, including experts such as addiction specialists, functional medicine doctors, fitness coaches, meditation teachers, friends, family, and the like. In such a situation, expert learner 148 may include any and all such experts on expert list 144. In an embodiment, expert learner 148 may presenting multiple possible results to user and allowing a user to select an expert that user feels may be beneficial and help the user achieve user's behavior modification. In an embodiment, expert learner 148 may rank possible experts in some sort of order within expert list 144 such as including rank of what impact each expert may have on any particular behavior modification. For example, a user with a behavior modification such as shopping addiction may have an addiction specialist ranked high on expert list 144 while a user with a behavior modification such as a desire to lose seven pounds of body weight in anticipation of a wedding, may have an addiction specialist ranked very low if included at all but may have a fitness coach or weight loss professional ranked very high. Alternatively or additionally, processes may include additional machine learning steps. For instance, expert learner 148 may perform one or more lazy learning processes using a more comprehensive set of user data to identify a more probably correct result of the multiple results. Results may be presented and/or retained with rankings, for instance to advise a user of the relative probabilities of various experts being correct or ideal choices for a given person; alternatively or additionally, experts associated with a probability of success or suitability below a given threshold and/or experts contradicting results of the additional process, may be eliminated.

Continuing to refer to FIG. 5, expert learner 148 may be designed and configured to generate further training data and/or to generate outputs using longitudinal data 516. As used herein, longitudinal data 516 may include a temporally ordered series of data concerning the same person, or the same cohort of persons; for instance, longitudinal data 516 may describe a series of behavior modifications received one day or one month apart over the course of a year. Longitudinal data 516 may related to a series of samples tracking response of one or more experts recorded regarding a person undergoing one or more behavior modifications. Expert learner 148 may track one or more elements of behavior modification data, experts, and/or expert qualities for instance, a linear, polynomial, and/or splined function to data points; linear, polynomial, or other regression across larger sets of longitudinal data, using, for instance, any regression process as described above, may be used to determine a best-fit graph or function for the effect of a given behavior modification over time with the help of any one particular expert and/or expert quality. Functions may be compared to each other to rank experts; for instance, an expert associated with a steeper slope in curve representing improvement in a behavior modification, and/or a shallower slope in a curve representing a slower decline, may be ranked higher than an expert associated with a less steep slope for an improvement curve or a steeper slope for a curve marking a decline. Experts associated with a curve and/or terminal data point representing a value that does not associate with a previously detected behavior modification may be ranked higher than one that is not so associated. Information obtained by analysis of longitudinal data 516 may be added to training set 500, expert database, and/or user database 416.

Figure 6:
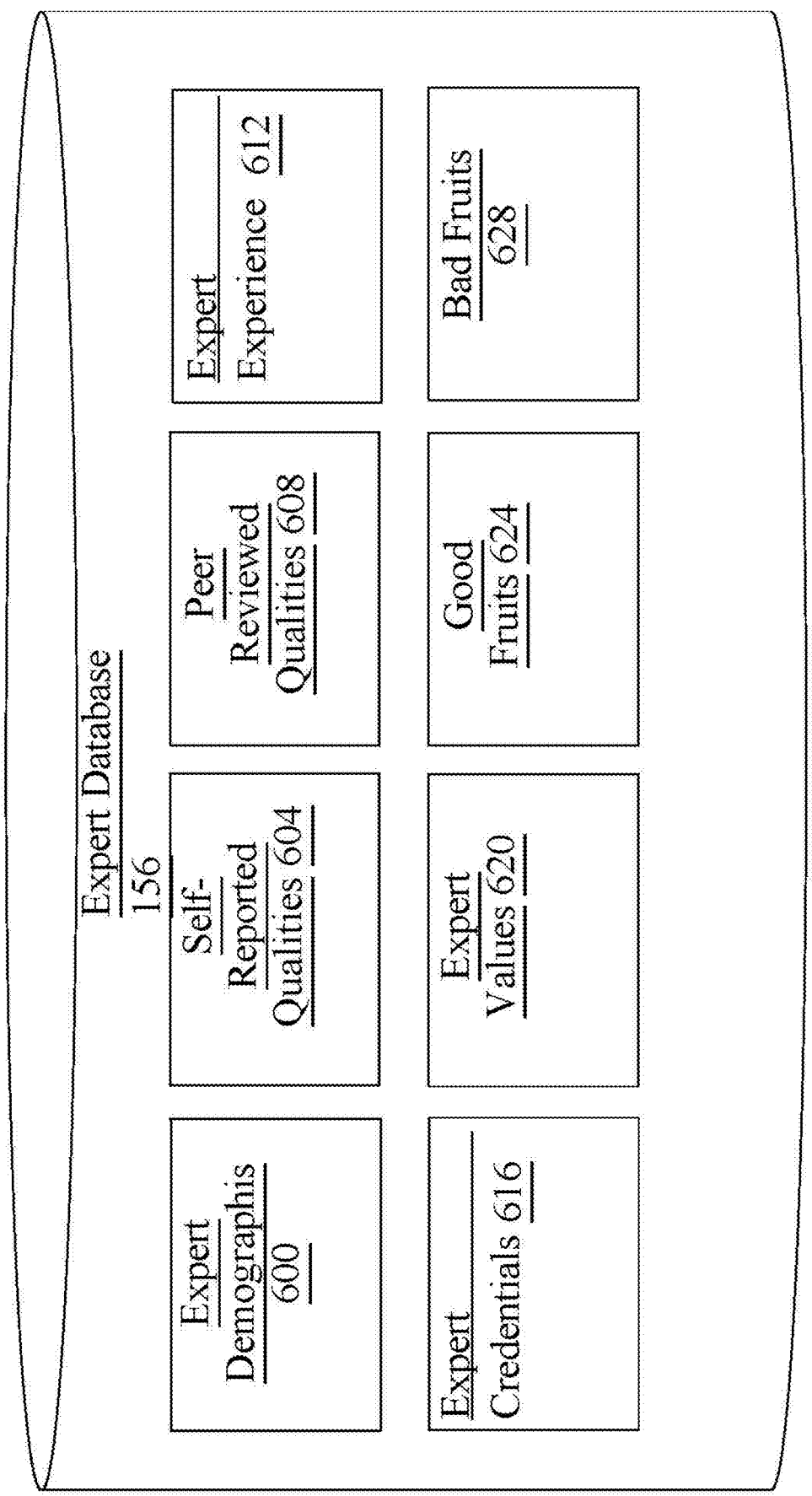
FIG. 6 is a block diagram illustrating an exemplary embodiment of an expert database.

Referring now to FIG. 6, an exemplary embodiment of expert database 156 is illustrated. Expert database 156 may include any database or datastore suitable for language database 124 as described above. Expert database 156 may include one or more entries linking labels and/or information associated with one or more experts. Linking may be performed by reference to historical data concerning experts such as previous encounters and/or interactions with specific experts. Experts may include any of the experts as described herein. Experts may work together to create an inner support circle to provide encouragement, support, mentorship, guidance, and/or services to a user in response to a user's desired behavior modification. Experts may be selected based on qualities an expert may exhibit, as well as desired qualities a user is seeking in an expert as well as a user's preference for an expert such as an expert that is located within a certain geographical location that is accessible to user. In an embodiment, at least a request for a behavior modification may be linked to a maximum number of experts that may create a user's inner circle. For example, at least a request for a behavior modification such as a pornography addiction may be linked to a maximum number of ten to twelve experts, reflecting Jesus's twelve expert disciples in the Bible.

With continued reference to FIG. 6, one or more experts may be categorized based on one or more functions and/or qualities that an expert may exhibit. Family experts may include any family member of user who may provide encouragement, support, mentorship, guidance, and/or services to a user in response to user's desired behavior modification. Family experts may include experts who are descendants of a common ancestor as user. This may include for example immediate family members such as parents, siblings such as brothers and sisters, as well as immediate family such as aunts, uncles, cousins, grandparents, and the like. Family experts may include adopted family members such as when a child is adopted after being given up by birth parents or when a user has close friends who user considers to be part of user's family. For example, an adult aged user who may be orphaned after the death of both parents may consider a close friend's family to be user's adopted family if user attends holidays such as Thanksgiving or Christmas with close friend's family. Experts may include spiritual experts. Spiritual experts may include experts specializing in the conscious mind body connection who may provide encouragement, support, mentorship, guidance, and/or services to a user in response to user's desired behavior modification. Spiritual experts may include for example, religious leaders such as a pastor at a church, a rabbi at a synagogue, a member of the Buddhist community, an Inman and the like.

With continued reference to FIG. 6, experts include nutrition experts. Nutrition experts may include experts specializing in diet, nutrition, and/or supplementation who may provide encouragement, support, mentorship, guidance, and/or services to a user in response to user's desired behavior modification. Nutrition experts may include nutritionists, dieticians, chefs, certified nutrition specialist, nutrition coaches, and/or holistic health coaches. Nutrition experts may include for example, a registered dietician who may aid a user with a behavior modification such as weight loss to create customized meal plans to aid user in losing two pounds each week. Experts may include fitness experts. Fitness experts may include experts specializing in physical activities such as sports, exercise, movement, and/or activities of daily life who may provide encouragement, support, mentorship, guidance, and/or services to a user in response to user's desired behavior modification. Fitness experts may include for example, personal trainers, sports coaches, yoga instructors, group exercise instructors, athletic trainers, physical therapists, fitness instructors, authors of fitness instruction books or manuals, experts in kinesiology, and/or experts skilled in anatomy and/or biomechanics. For example, a fitness expert such as a physical therapist may provide guidance to a user with a desired behavior modification to recover from an injury such as planter fasciitis and/or a bone bruise.

With continued reference to FIG. 6, experts may include functional medicine experts. Functional medicine experts may include experts specializing in the practice of functional medicine who may provide encouragement, support, mentorship, guidance, and/or services to a user in response to user's desired behavior modification. Functional medicine experts may include for example, medical doctors, osteopathic medicine doctors, nurse practitioners, physician assistants, chiropractic doctors, naturopathic doctors, pharmacists, nurses, licensed practical nurses, psychologists, respiratory therapists, social workers, x-ray technicians, pharmacy technicians, mental health professionals, medical assistants, and the like. For example, a functional medicine expert such as a physician assistant may provide mentorship to a user with a behavioral modification that includes heroin addiction as the user initially detoxes off heroin. Experts may include friend experts. Friend experts may include friends of user who may provide encouragement, support, mentorship, guidance, and/or services to a user in response to user's desired behavior modification. Friends may include a person whom a user knows and with whom a user has a bond of mutual affection. Friends may include persons from different aspects of a user's life such as friends from user's work, friends from user's childhood, friends from user's college, friends from user's graduate school, friends from user's neighborhoods, friends from user's spiritual community, friends from user's organized sports, friends from user's knitting circle and the like. For example, a friend of user from childhood may provide support and encouragement for a user with a behavior modification such as a desire to recover from anorexia that user has been diagnosed with since puberty. Experts may include community experts. Community experts may include individuals in user's community who may provide encouragement, support, mentorship, guidance, and/or services to a user in response to user's desired behavior modification. Community may include a group of people having a shared characteristic. Shared characteristic may include individuals with a shared religious view, individuals with a shared political view, individuals who participate in a shared activity such as an organized sport, dinner club, knitting circle, book club, and the like. Community experts may include individuals who have a shared characteristic with user. For example, a community expert such as an individual who belongs to user's tennis club may provide support for user with a behavior modification to become more physically fit. In yet another non-limiting example, a community expert such as an individual who participates in a cooking class with user may provide encouragement for user with a behavior modification to cook more meals at home from scratch instead of relying on take out. Experts may include miscellaneous experts. Miscellaneous experts may include experts who may provide encouragement, support, mentorship, guidance, and/or services to a user in response to user's desired behavior modification pertaining to any other applicable industry. Experts may include informed advisors such as artificial intelligence informed advisors, spiritual professional informed advisors, nutrition professional informed advisors, fitness professional informed advisors, functional medicine informed advisors, friends and family informed advisors, electronic behavior coach informed advisors, and miscellaneous informed advisors.

With continued reference to FIG. 6, one or more database tables contained within expert database 156 may include expert demographics table 600; expert demographics table 600 may include background information about an expert such as name, address, phone number, email address, and any other identifying information that may be useful about an expert. One or more database tables contained within expert database 156 may include self-reported qualities table 604; self-reported qualities table 604 may contain any qualities that an expert may self-report. Qualities may include any of the qualities as described herein including both good and bad qualities. For example, an expert may self-report that expert is patient, slow to anger, and gentle while another expert may self-report an undesirable quality such as jealously. One or more database tables contained within expert database 156 may include peer-reviewed qualities table 608; peer-reviewed qualities table 608 may contain any qualities that a peer of expert may report about expert. Peer may include for example a friend, co-worker, family member, acquittance, and/or another user who expert helped in regards to a behavior modification. For example, a friend may provide information about certain qualities about an expert such that a particular expert is hopeful, dependable, and honest. One or more database tables contained within expert database 156 may include expert experience table 612; expert experience table 612 may include any information pertaining to a particular experience or behavior modification that an expert had experience with or overcame. For example, expert experience table 612 may include information about an expert's struggle with alcohol addiction and different behavior modifications and experts that aided expert in overcoming expert's alcohol addiction. One or more database tables contained within expert database 156 may include expert credentials table 616; expert credentials table 616 may include any information pertaining to certain educational credentials or certificates or work credentials that an expert may possess. For example, expert credentials table may include information about a functional medicine doctor's training as a functional medicine doctor and any certificates functional medicine doctor may have completed such as training programs in addiction or hormonal health. In yet another non-limiting example, expert credentials table 616 may include information about a therapist's license status or a health coach's certificate program. One or more database tables contained within expert database 156 may include expert values table 620; expert values table 620 may include information about an expert's personal values. Values may include for example, how an expert feels about certain values such as patience, kindness, truthfulness. Boastfulness. Rudeness, self-seeking and the like. One or more database tables contained within expert database 156 may include good fruits table 624; good fruits table 624 may include information about an expert's thoughts and experiences with good fruits. Good fruits may include positive mindsets and positive character traits, actions, and deeds such as love, joy, peace, self-control and the like. One or more database tables contained within expert database 156 may include bad fruits table 628; bad fruits table 628 may include information about an expert's thoughts and experiences with bad fruits. Bad fruits may include negative mindsets and negative character traits, actions and deeds such as sexual immorality, idolatry, debauchery, hatred, and jealousy.

Referring now to FIG. 7, an exemplary embodiment of expert quality database 160 is illustrated. Expert quality database 160 may include any database or datastore suitable for language database 124 as described above. Expert quality database 160 may include one or more entries linking qualities associated with one or more experts. Linking may be performed by reference to historical data concerning experts such as previous encounters and/or interactions with specific experts. Qualities may include any of the experts as described herein. Qualities may be collected based on expert self-reported qualities and/or from peer reviewed information such as family members, friends, co-workers, and acquittances who may self-report a specific quality about an expert. Expert quality database 160 may include one or more database tables containing information about a particular quality of an expert. One or more database tables contained within expert quality database 160 may include love table 700; love table 700 may include information about an expert's commitment to the well being of others. One or more database tables contained within expert quality database 160 may include joy table 704; joy table 704 may include information about an expert's gladness not based on circumstances. One or more database tables contained within expert quality database 160 may include peace table 708; peace table 708 may include information about an expert's lack of fear and sense of contentment. One or more database tables contained within expert quality database 160 may include patience table 712; patience table 712 may include information about an expert's slowness to speak and slowness to anger. One or more database tables contained within expert quality database 160 may include kindness table 716; kindness table 716 may include information about an expert's eagerness to put others at ease. One or more database tables contained within expert quality database 160 may include goodness table 720; goodness table 720 may include information about an expert's generosity and open-heartedness. One or more database tables contained within expert quality database 160 may include faithfulness table 724; faithfulness table 724 may include information about an expert's dependability, loyalty, and trustworthiness. One or more database tables contained within expert quality database 160 may include gentleness table 728; gentleness table may include information about an expert's humbleness, calmness, and non-threatening abilities. In an embodiment, one or more database tables contained within expert quality database 160 may include qualities that a user desires and/or seeks in an expert. In an embodiment, one or more database tables contained within expert quality database 160 may include undesirable qualities of a user such as sexual immorality, lustfulness, idolatry, witchcraft, selfish ambitions, demons, debauchery, drunkenness, corruption, hatred, malice, deceit, jealousy, envy, anger, and greed. In an embodiment, qualities contained within expert quality database 160 may include information such as how often an expert may exhibit any one particular quality. For example, qualities may be ranked such as never exhibiting, rarely exhibiting, sometimes exhibiting, frequently exhibiting, and always exhibiting.

Referring now to FIG. 8, an exemplary embodiment of variables database 420 is illustrated. Variables database 420 may be implemented as any database and/or datastore suitable for use as language database 124 as described above. One or more database tables in variables database 420 may include, without limitation, expert experience table 800; expert experience table 800 may include a user preference for an expert who has had a similar experience or who may have experienced a similar or same behavior modification as user. For example, a user with a behavior modification such as sex addiction may prefer an expert who has similarly experienced sex addiction. One or more database tables in variables database 420 may include, without limitation, expert gender table 804; expert gender table 804 may include a user preference for an expert who is of a certain gender such as male or female. For example, a female user may prefer an expert such as a functional medicine doctor to also be a female or a male user may prefer an expert such as a fitness instructor to also be male. One or more database tables in variables database 420 may include, without limitation, expert location table 808; expert location table 808 may include a user preference for an expert within a certain geographical location. For example, a user who resides in Portland, Me. may have a preference for an expert who is located within a twenty five mile radius of Portland, while a user who resides in Rhode Island may have a preference for an expert who is located anywhere within the state of Rhode Island. One or more database tables in variables database 420 may include, without limitation, expert age table 812; expert age table 812 may include a user preference for an expert who is of a certain age or within a certain age range. For example, a user with a user with drug addiction may prefer an expert such as a sponsor in narcotics anonymous to be of same age as user or be no more than five years older than user. In yet another non-limiting example, a user with an eating disorder may prefer an addiction specialist who is no more than ten years older than user. One or more database tables in variables database 420 may include expert qualification table 816; expert qualification table 816 may include a user preference for an expert with a specific qualification or training. For example, a user may prefer an expert such as a therapist who has obtained a master's degree in mental health counseling or a fitness coach who has obtained a diploma in health, fitness, and exercise instruction. One or more database tables in variables database 420 may include, without limitation previous encounter table 820; previous encounter table 820 may include a user preference for an expert that a user previously had an encounter with. For example, a user who previously attended counseling with a nutritionist three years earlier may prefer to see that same nutritionist again instead of going to a new nutritionist user has never met with before. One or more database tables in variables database 420 may include, without limitation expert recommendation table 824; expert recommendation table 824 may include a user preference for a particular expert that may have been recommended to user. For example, a user may have a preference for a functional medicine doctor that user's friend recommended to user. One or more database tables in variables database 420 may include without limitation miscellaneous table 828; miscellaneous table 828 may include any other miscellaneous variable that a user may enter and/or may have a preference form such as cost for a particular expert. In an embodiment, miscellaneous variable may include for example, an expert's views on spirituality, such as whether or not an expert has a faith based practice or not.

Figure 9:
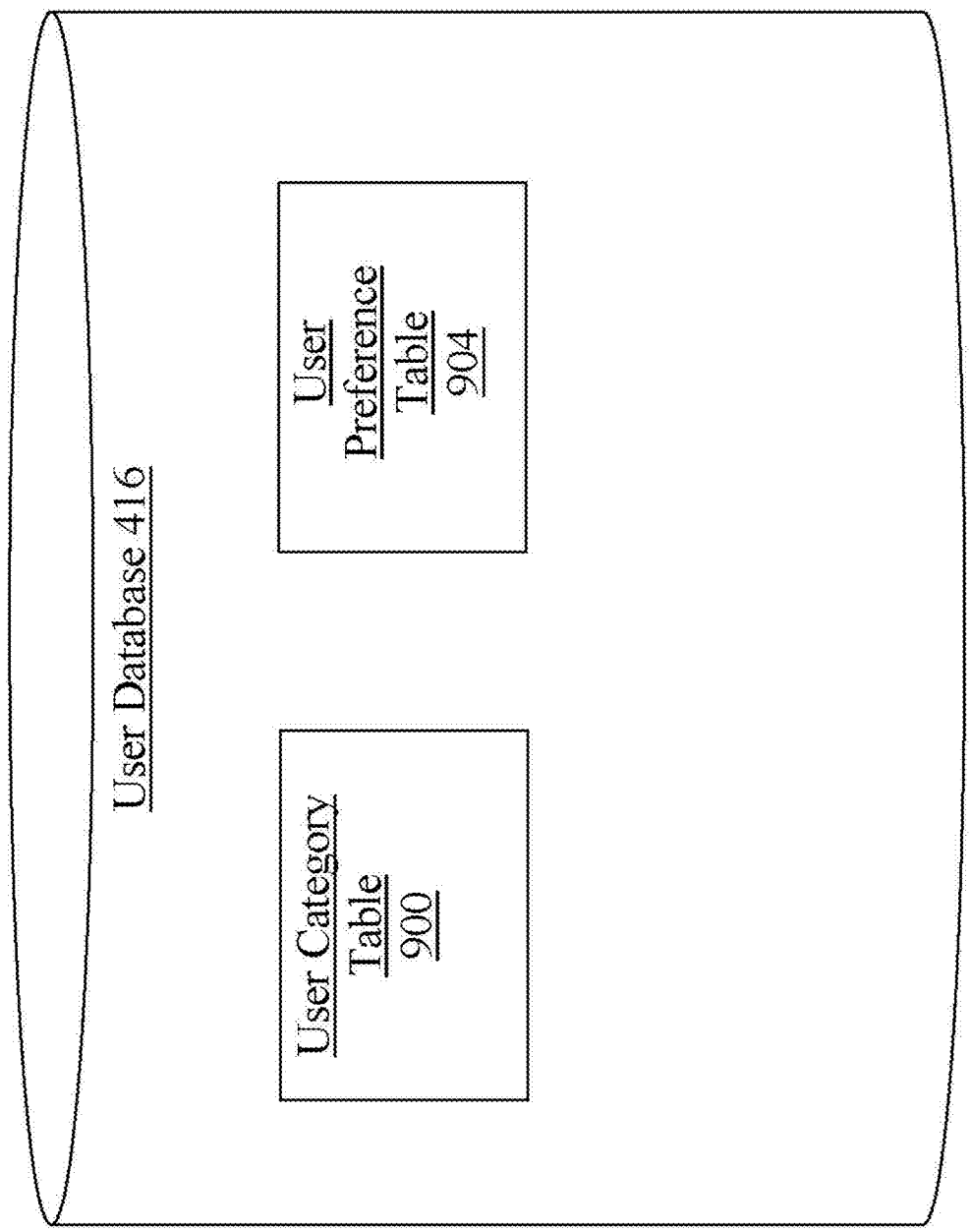
FIG. 9 is a block diagram illustrating an exemplary embodiment of a user database.

Referring now to FIG. 9, an exemplary embodiment of user database 416 is illustrated. User database 416 may be implemented as any database and/or datastore suitable for use as language database 124 as described above. One or more database tables in user database 416 may include, without limitation, a user category table 900; user category table 900 may include information pertaining to a user's preference for a particular category of expert. For example, a user with a behavior modification such as weight loss may have a preference for an expert such as a nutritionist or dietician. One or more database tables in user database 416 may include, without limitation, a user preference table 904; user preference table 904 may include information pertaining to a user's preference for a particular expert, a user preference for a particular quality of an expert such as exhibiting a quality such as Christianity or any other faith based practice, and/or any other user preference in regards to an expert and/or expert quality.

Figure 10:
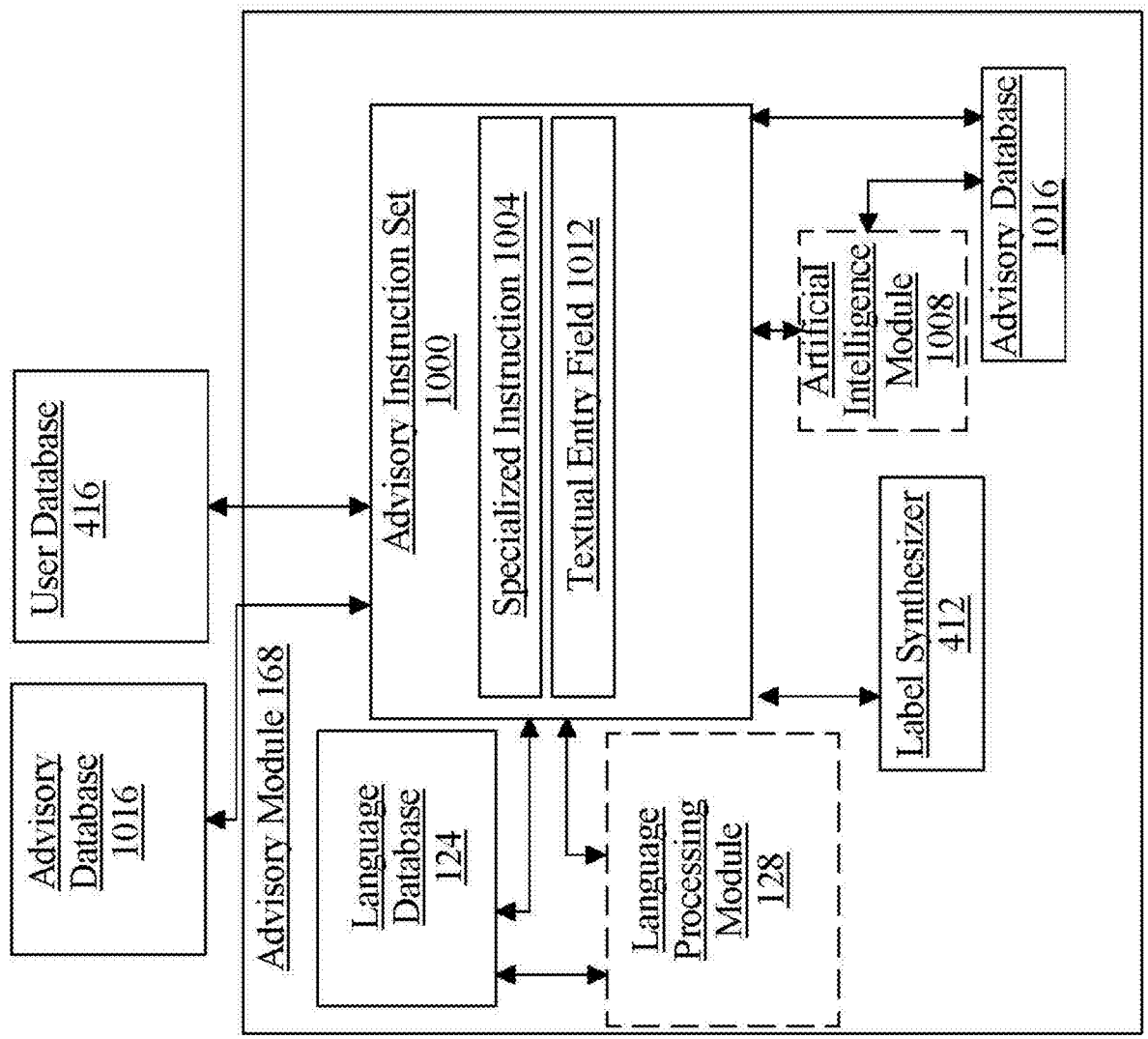
FIG. 10 is a block diagram illustrating an exemplary embodiment of an advisory module as associated system elements.

Referring now to FIG. 10, an exemplary embodiment of an advisory module 168 is illustrated. Advisory module 168 may be configured to generate an advisor instruction set 1000 as a function of the at least a request for a behavior modification and/or the expert list 144. Advisory instruction set 1000 may include an advisory input such as a textual input generated as a function of the at least a request for a behavior modification. For example, a behavior modification for a user to feel less depressed may generate an advisory instruction set 1000 that may include a request for a user to speak with a functional medicine doctor and/or contain user's health records and/or previous medications user has taken for depression and/or previous treatments user has undergone for depression. Advisory instruction set 1000 may include one or more specialized instructions 1004; specialized instructions, as used herein, are instructions the contents of which are selected for display to a particular informed advisor and/or a particular user. Selection of instructions for a particular informed advisor may be obtained, without limitation, from information concerning the particular informed advisor, which may be retrieved from a user database 416 and/or advisory database as described in more detail below. As a non-limiting example, where an informed advisor is a doctor, specialized instruction 1004 ma may include one or more medical records of user, which may, as a non-limiting example, be downloaded or otherwise received from an external database containing medical records and/or a database (not shown) operating on at least a server 104. As a further non-limiting example medical data relevant to fitness, such as orthopedic reports, may be provided to an informed advisor whose role is as a fitness instructor, coach, or the like.

In an embodiment, and continuing to refer to FIG. 10, advisory module 168 may be configured to receive at least an advisory input from the advisor client device 116. At least an advisory input may include any information provided by an informed advisor via advisor client device 116. Advisory input may include medical information and/or advice. Advisory input may include user data, including user habits, preferences, religious affiliations, constitutional restrictions, or the like. Advisory input may include spiritual and/or religious advice. Advisory input may include user-specific diagnostic information. Advisory input may be provided to user client device 112; alternatively or additionally, advisory input may be fed back into system 100, including without limitation insertion into user database 416, inclusion in or use to update expert module 140, for instance by augmenting machine-learning models and/or modifying machine-learning outputs via a lazy-learning protocol or the like as described above.

With continued reference to FIG. 10, advisory module 168 may include an artificial intelligence advisor 1008 configured to perform a user textual conversation with the user client device 112. Artificial intelligence advisor 1008 may provide output to advisor client device 116 and/or user client device 112. Artificial intelligence advisor 1008 may receive inputs from advisor client device 116 and/or user client device 112. Inputs and/or outputs may be exchanged using messaging services and/or protocols, including without limitation any instant messaging protocols. Persons skilled in the art, up reviewing the entirety of this disclosure, will be aware of a multiplicity of communication protocols that may be employed to exchange text messages as described herein. Text messages may be provided in textual form and/or as audio files using, without limitation, speech-to-text and/or text-to-speech algorithms.

With continued reference to FIG. 10, advisory module 168 may output, with advisory output, a textual entry field 1012. Textual entry field 1012 may include a searchable input field that allows entry of a search term such as a word or phrase to be entered by a user such as an informed advisor. In an embodiment, textual entry field 1012 may allow for entry of a search term to be matched with labels contained within the at least a request for a behavior modification. For example, an informed advisor such as fitness coach may enter into a search term a results of a user's new fitness regimen. In such an instance, user such as an informed advisor may be able to search multiple results such as fitness regimen over a certain period of time such as several years and/or months. In yet another non-limiting example, an informed advisor such as a fitness professional may search for user's most recent exercise log and/or nutrition records. In an embodiment, textual entry field 1012 may allow a user such as an informed advisor to navigate different areas of advisory output. For example, an informed advisor may utilize textual entry field 1012 to navigate to different locations such as a table of contents, and or sections organized into different categories as described in more detail below.

With continued reference to FIG. 10, advisory module 168 contains advisory database 1016. Advisory database 1016 may be implemented as any database and/or datastore suitable for use as an advisory database. An exemplary embodiment of an advisory database 1016 is provided below in FIG. 12.

Figure 11:
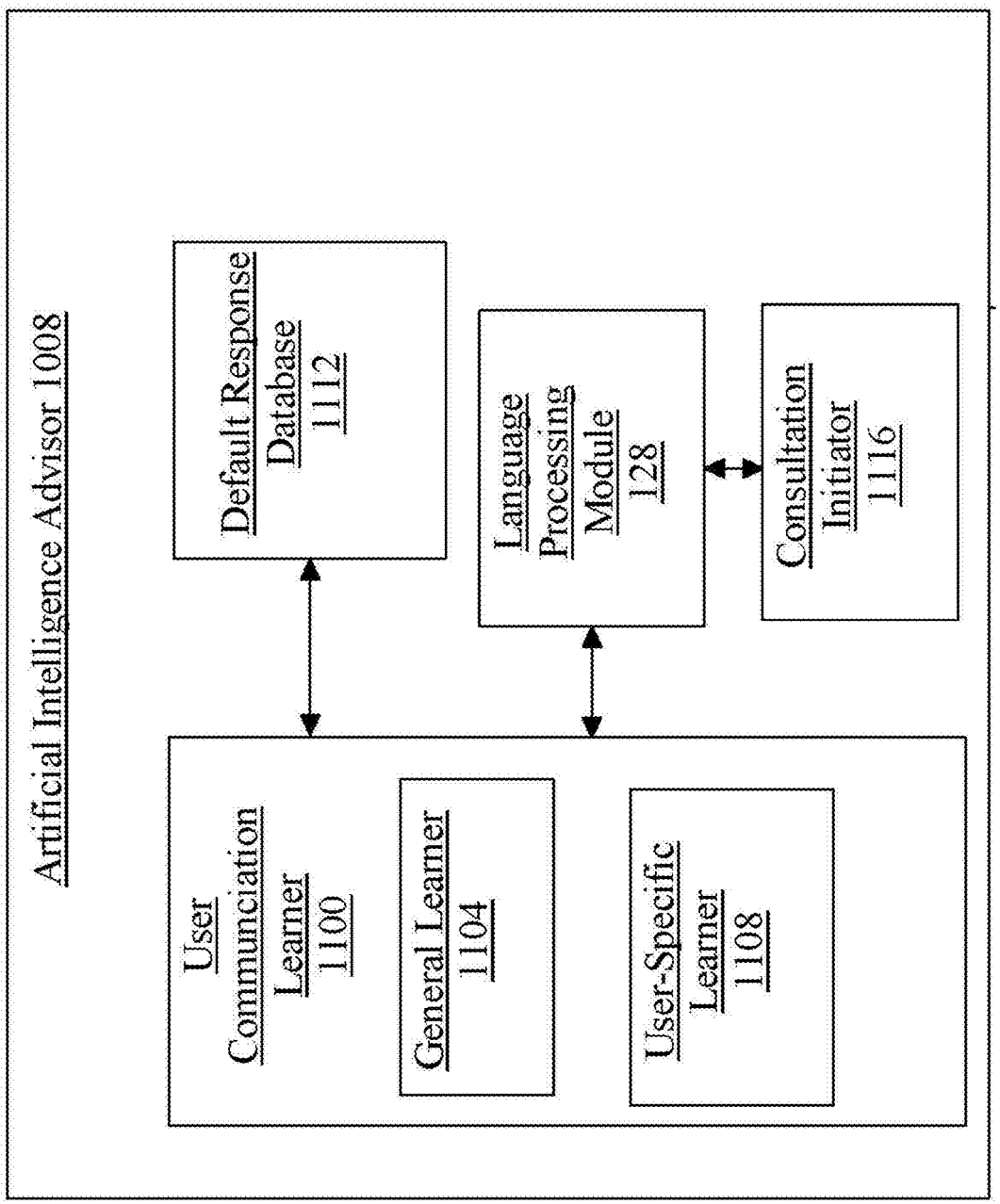
FIG. 11 is a block diagram illustrating an exemplary embodiment of an artificial intelligence advisor and associated system elements.

Referring now to FIG. 11, an exemplary embodiment of an artificial intelligence advisor 1008 is illustrated. Artificial intelligence advisor 1008 may include a user communication learner 1100. User communication learner 1100 may be any form of machine-learning learner as described above, implementing any form of language processing and/or machine learning. In an embodiment, user communication learner 1100 may include a general learner 1104; general learner 1104 may be a learner that derives relationships between user inputs and correct outputs using a training set that includes, without limitation, a corpus of previous conversations. Corpus of previous conversations may be logged by at least a server 104 as conversations take place; user feedback, and/or one or more functions indicating degree of success of a conversation may be used to differentiate between positive input-output pairs to use for training and negative input-output pairs not to use for training. Outputs may include textual strings and/or outputs from any databases, modules, and/or learners as described in this disclosure, including without limitation behavior modifications, experts expert qualities, expert list 144, user information, or the like; for instance, general learner 1104 may determine that some inputs optimally map to textual response outputs, while other inputs map to outputs created by retrieval of module and/or database outputs, such as retrieval of behavior modification data, experts, expert qualities or the like. User communication learner may include a user-specific learner 1108, which may generate one or more modules that learn input-output pairs pertaining to communication with a particular user; a user specific learner 1108 may initially use input-output pairs established by general learner 1104 and may modify such pairs to match optimal conversation with the particular user by iteratively minimizing an error function.

Still referring to FIG. 11, general learner 1104 and/or user-specific learner 1108 may initialize, prior to training, using one or more record retrieved from a default response database 1112. Default response database 1112 may link inputs to outputs according to initial relationships entered by users, including without limitation experts as described above, and/or as created by a previous instance or version of general learner 1104 and/or user-specific learner 1108. Default response database 1112 may periodically be updated with information from newly generated instances of general learner 1104 and/or user-specific learner 1108. Inputs received by artificial intelligence advisor 1008 may be mapped to canonical and/or representative inputs by synonym detection as performed, for instance, by a language processing module 128; language processing module 128 may be involved in textual analysis and/or generation of text at any other point in machine-learning and/or communication processes undergone by artificial intelligence advisor 1008.

Figure 12:
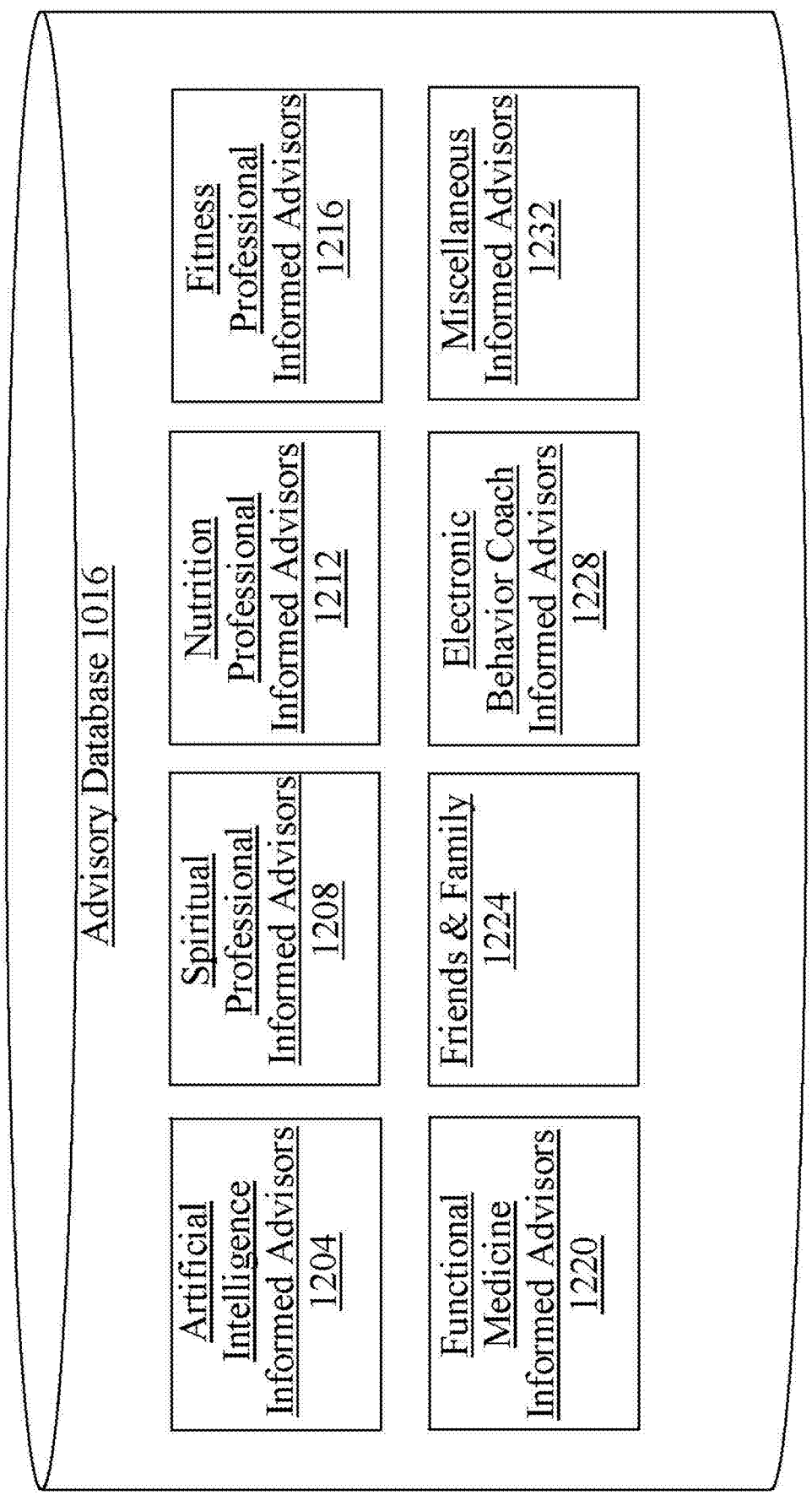
FIG. 12 is a block diagram illustrating an exemplary embodiment of an advisory database.

Referring now to FIG. 12, an exemplary embodiment of advisory database 1016 is illustrated. One or more database tables in advisory database 1016 may link to data surrounding an informed advisor. Advisory database 1016 may include one or more database tables categorized by expertise of informed advisor. One or more database tables in advisory database 1016 may include, without limitation, an artificial intelligence informed advisors table 1204, which may contain any and all information pertaining to artificial intelligence informed advisors. One or more database tables in advisory database 1016 may include, without limitation, a spiritual professional informed advisors table 1208, which may contain any and all information pertaining to spiritual professional informed advisors. Spiritual professional informed advisors may include spiritual professionals who may participate in cultivating spirituality through exercise of practices such as prayer, meditation, breath work, energy work, and the like. One or more database tables in advisory database 1016 may include, without limitation, a nutrition professional informed advisors table 1212, which may include any and all information pertaining to nutritional informed advisors. Nutritional informed advisors may include dieticians, chefs, and nutritionists who may offer expertise around a user's diet and nutrition state and supplementation. One or more database tables in advisory database 1016 may include, without limitation a fitness professional informed advisors table 1216, which may include any and all information pertaining to fitness professional informed advisors. Fitness professional informed advisors may examine the fitness state of a user and may include personal trainers, coaches, group exercise instructors, and the like. One or more database tables in advisory database 1016 may include, without limitation a functional medicine informed advisors table 1220, which may include any and all information pertaining to functional medicine informed advisors. Functional medicine informed advisors may include doctors, nurses, physician assistants, nurse practitioners and other members of the health care team. One or more database tables in advisory database 1016 may include, without limitation a friends and family informed advisors table 1224, which may include any and all information pertaining to friends and family informed advisors. Friends and family informed advisors may include friends and family members of a user who may create a positive community of support for a user. One or more database tables in advisory database 1016 may include, without limitation an electronic behavior coach informed advisor table 1228, which may include any and all information pertaining to electronic behavior coach informed advisors. Electronic behavior coach informed advisors may assist a user in achieving certain results such as modifying behaviors to achieve a result such as assisting in addition recovery and/or changing a user's eating habits to lose weight. One or more database tables in advisory database 1016 may include without limitation a miscellaneous informed advisor table 1232, which may include any and all information pertaining to miscellaneous informed advisors. Miscellaneous informed advisors may include any informed advisors who do not fit into one of the categories such as for example insurance coverage informed advisors. Miscellaneous informed advisor table 1232 may also contain miscellaneous information pertaining to informed advisors such as a user's preference for informed advisors in a certain geographical location and/or other preferences for informed advisors.

Figure 13:
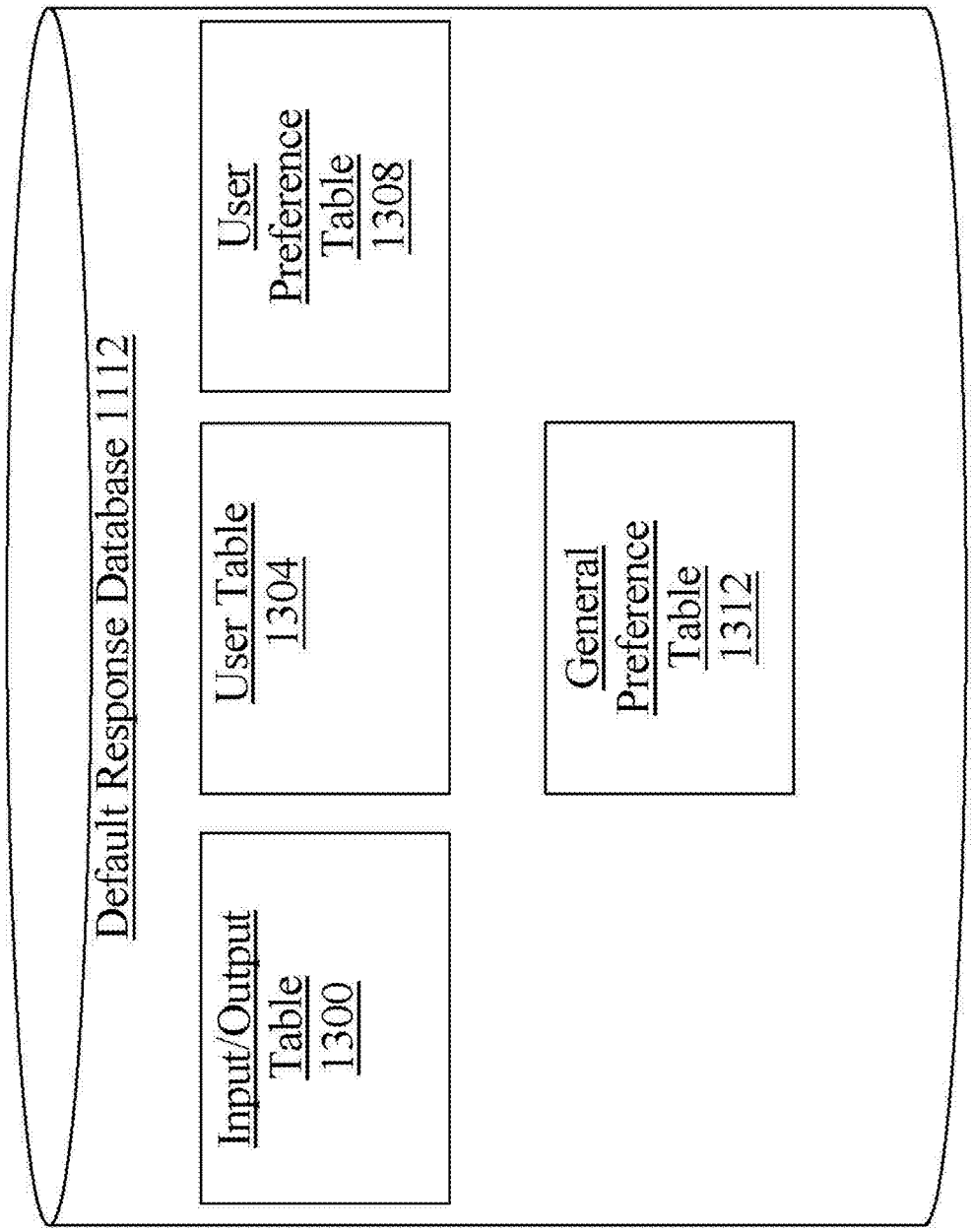
FIG. 13 is a block diagram illustrating an exemplary embodiment of a default response database.

Referring now to FIG. 13, an exemplary embodiment of a default response database 1112 is illustrated. Default response database 1112 may be implemented as any database and/or datastore suitable for use as described above. One or more database tables in default response database 1112 may include, without limitation, an input/output table 1300, which may link default inputs to default outputs. Default response database 1112 may include a user table 1304, which may, for instance, map users and/or a user client device 112 to particular user-specific learners and/or past conversations. Default response database 1112 may include a user preference table 1308 listing preferred modes of address, turns of phrase, or other user-specific communication preferences. Default response database 1112 may include a general preference table 1312, which may track, for instance, output-input pairings associated with greater degrees of user satisfaction.

Referring again to FIG. 11, artificial intelligence advisor may include a consultation initiator 1116 configured to detect a consultation event in a user textual conversation and initiate a consultation with an informed advisor as a function of the consultation event. A consultation event, as used herein, is a situation where an informed advisor is needed to address a user's situation or concerns, such as when a user should be consulting with a doctor regarding an apparent medical emergency or new condition, or with an advisor who can lend emotional support when particularly distraught such as an acute behavior modification such as addiction detoxification. Detection may be performed, without limitation, by matching an input and/or set of inputs to an output that constitutes an action of initiating a consultation; such a pairing of an input and/or input set may be learned using a machine learning process, for instance via general learner and/or user specific learner 1108. In the latter case, information concerning a particular user's physical or emotional needs or condition may be a part of the training set 500 used to generate the input/input set to consultation event pairing; for instance, a user with a history of heart disease may trigger consultation events upon any inputs describing shortness of breath, chest discomfort, arrhythmia, or the like. Initiation of consultation may include transmitting a message to an advisor client device 116 associated with an appropriate informed advisor, such as without limitation transmission of information regarding a potential medical emergency to a doctor able to assist in treating the emergency. Initiation of consultation may alternatively or additionally include providing an output to the user informing the user that a consultation with an informed advisor, who may be specified by name or role, is advisable.

Figure 14:
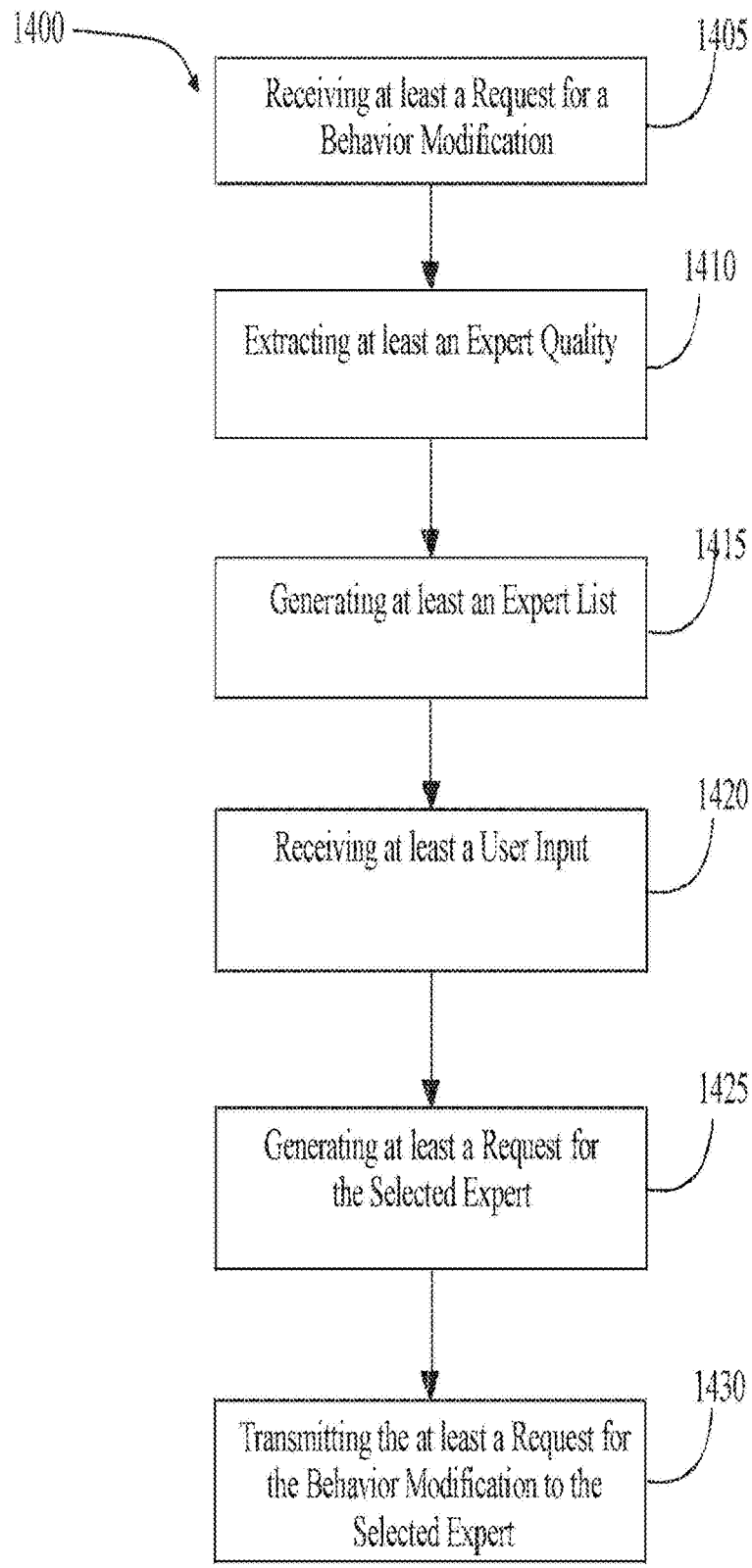
FIG. 14 is a flow diagram illustrating an exemplary embodiment of a method of an online support group for behavior modification.

Referring now to FIG. 14, an exemplary embodiment of a method 1400 of automated analysis of behavior modification data is illustrated. At step 1405 the at least a server receives at least a request for a behavior modification. This may be implemented, without limitation, as described above in reference to FIGS. 1-14. At least a request for a behavior modification may include any of the requests for a behavior modification as described above in reference to FIGS. 1-14. Receiving at least a request for a behavior modification may be performed using any methodologies as described herein including any computer and/or network methodologies. In an embodiment, receiving at least a request for a behavior modification may be received from a user client device 112. User client device 112 may include any of the user client devices 112 as described above in reference to FIG. 1. In an embodiment, user client device 112 may be operated by a user, and/or operated by a friend, acquittance, family member, co-worker or any other individual. In such an instance, another user may generate at least a request for a behavior modification for another user. For example, a concerned friend may generate at least a request for a behavior modification for a user who is suffering from a heroin addiction. In an embodiment, receiving at least a request for a behavior modification may be receive from an advisory client device. Advisory client device may include any of the advisory client devices as described above in reference to FIG. 1. In an embodiment, advisory client device may be operated by an informed advisor, including any of the informed advisors as described above in reference to FIGS. 1-14. For example, a functional medicine doctor who has been treating a user for depression may generate at least a request for a behavior modification from advisor client device 116 after finding out that user's depression causes him to drink in excess. In yet another non-limiting example, an informed advisor such as a fitness coach may generate at least a request for a behavior modification for a user who wishes to lose weight. In yet another non-limiting example, a spiritual professional informed advisor such as a priest at a church may generate at least a behavior modification using advisory client device for a user after a user consults with the priest as to overcome user's gambling addiction. In yet another non-limiting example, a nutrition professional informed advisor such as a dietician may generate at least a request for a behavior modification using advisor client device 116 for user to cook at least 3 meals each week at home after user complains to dietician about eating out frequently during the week.

With continued reference to FIG. 14, at step 1410 the at least a server extracts at least an expert quality as a function of the at least a request for a behavior modification. This may be implemented, without limitation, as described above in reference to FIGS. 1-14. Extracting may include for example, utilizing parsing module 120, language processing module 128, and/or language database 124 to extract at least an expert quality. This may be performed using any of the methodologies as described above in reference to FIGS. 1-14. Expert quality may include any of the expert qualities as described above in reference to FIGS. 1-14. In an embodiment, extracting at least an expert quality may include parsing the at least a request for a behavior modification and extracting at least an expert quality from a database using the at least a request for a behavior modification. In an embodiment, at least a request for a behavior modification may be linked to a quality of at least an expert and stored in a database such as in language database, expert database, and/or expert quality database 160. For example, a behavior modification such as alcohol addiction may be linked to an expert quality such as patience, trustful, and protective. In yet another non-limiting example, a behavior modification such as developing a Christian faith practice may be linked to an expert quality such as faithfulness, keeping no record of wrongs, rejoicing with the truth, and not delighting in evil. In an embodiment at least a request for a behavior modification may be linked to undesirable traits that an expert should not display. For example, a behavior modification such as sex addiction should not be linked to an expert quality that includes sexual impurity, orgies, and lustfulness. In yet another non-limiting example, at least a request for a behavior modification such as shoplifting should not be linked to an expert quality that includes envy, greed, and anger.

With continued reference to FIG. 14, at step 1415 the at least a server generates at least an expert list 144 as a function of the at least an expert quality and the at least a request for a behavior modification. This may be implemented, without limitation, as described above in reference to FIGS. 1-14. Expert list 144 may include any of the expert list 144 as described above in reference to FIGS. 1-14. In an embodiment, generating at least an expert list 144 may include matching at least an expert to at least an expert quality. Matching may include determining that an expert exhibit and/or displays a certain quality of an expert. Matching may include for example, consulting information about an expert and an expert's qualities as contained within expert database 156 and/or expert quality database 160. For example, at least a request for a behavior modification such as stopping smoking may be matched to an expert that exhibits and/or displays qualities including patience, not self-seeking, and kind. This may be done for example, by consulting expert database 156 and/or expert quality database 160 to find an expert who displays at least some if not all of the above mentioned qualities. In an embodiment, experts who do not meet any of the desired expert qualities may be eliminated while experts that display some or all of the desired expert qualities may be matched to a user and utilized to generate expert list 144. In an embodiment, experts contained within expert list 144 may be ranked in an order such as by those who exhibit the most desirable qualities down to those who possibly only exhibit one such quality. In an embodiment the at least a server may utilize expert learner 148 and/or machine-learning algorithms to generate the expert list 144. Machine-learning algorithms and training data utilized to generate machine-learning algorithms may include any of the machine-learning algorithms and training data as described above in reference to FIGS. 1-14. In an embodiment, expert list 144 may be transmitted to user such as to user client device 112. This may be implemented, utilizing any of the methodologies as described herein.

With continued reference to FIG. 14, at step 1420 the at least a server receives at least a user input selecting at least a selected expert as a function of the at least an expert list. User input, as used herein may include any user data including for example a user preference for at least an expert or a user dislike for at least an expert. The at least a server may receive at least a user input from user client device 112. User input may be received by the at least a server using any of the methodologies as described herein. In an embodiment, user may generate at least a user input after receiving for example, expert list 144. User input may include a preference and/or selection for a particular expert contained within expert list 144. In an embodiment, user may categorize and/or rank experts contained within expert list 144. For example, user input may include a ranking list of experts contained within expert list 144 and how comfortable and/or suitable user feels about working with different experts. User input may be utilized to aid in selecting at least an expert. In an embodiment, user input may include a rejection of all experts contained within expert list 144 and instead contain a suggestion and/or preference for another expert who user may have previous encounters and/or previous relationship with. For example, user may suggest a therapist user previously attended sessions with in lieu of a therapist suggested within expert list 144.

With continued reference to FIG. 14, selecting at least an expert may include producing a field of combinations of experts and selecting at least an expert using a lazy-learning process. Field of combinations of experts may include any of the fields of combinations as described above in reference to FIGS. 1-14. In an embodiment, field of combinations may include any of the experts as contained within expert list 144. Lazy-learning process may include any of the lazy-learning processes as described above in reference to FIGS. 1-14. Selecting at least an expert may include generating a loss function of user specific variables and minimizing the loss function. Loss function may include any of the loss functions as described above in reference to FIG. 1. User specific variables may include for example any of the user specific variables as described above in reference to FIG. 8. Variables may include any of the variables contained within variables database 420 such as for example a user preference for an expert of a certain gender, or an expert with a certain experience, or an expert located within a certain geographical location. Selecting at least an expert may occur as a function of a user entered category of at least an expert. For example, a user may preferer a certain category of an expert such as a dietician for a behavior modification such as weight loss, whereby other experts contained within expert list 144 such as a fitness trainer or health coach may be eliminated because they do not comply with user requested category of dietician. In an embodiment selecting at least an expert may include selecting a plurality of experts. In an embodiment, user may have final decision as to whether or not to select a particular expert. For example, a user who generates at least a request for a behavior modification for an addiction problem may ultimately may not be ready for an expert to aid user with user's addiction problem and as such user may ultimately block expert from user's life. In an embodiment, user may later unblock a particular expert such as after some time has passed and a user is ready to revisit user's addiction problem.

With continued reference to FIG. 14, at step 1425 the at least a server generates at least a request for the at least a selected expert. Generating at least a request for an expert may include evaluating the at least a request for a behavior modification. Language processing module 128 may evaluate at least a request for a behavior modification and may extract one or more words that may be linked to at least a request for an expert and/or an expert quality. For example, at least a request for a behavior modification that includes the world "addiction" may generate at least a request for an expert that includes a psychiatrist. In yet another non-limiting example, at least a request for a behavior modification that includes "weight loss" may generate at least a request for an expert that includes a dietician. Generating at least a request for an expert may be done by using a machine-learning model linking at least a request for a behavior modification to at least a request for an expert. Machine-learning model may use models to create correlations relating at least a request for a behavior modification such as infidelity to at least a request for an expert that includes a psychologist. Machine-learning models may group certain behavior modification to generate at least a request for an expert. For example, at least a request for a behavior modification that includes any type of addiction such as alcohol, drugs, gambling, shopping, pornography and the like may be linked to at least a request for an expert that includes a behavior coach who may be able to help user overcome user's addiction. In yet another non-limiting example, at least a request for a behavior modification that includes a mental health disorder such as clinical depression, anxiety disorder, bipolar disorder, attention-deficit hyperactivity disorder (ADHD), schizophrenia, obsessive compulsive disorder (OCD), and/or explosive personality disorder may be linked to at least a request for an expert such as a functional medicine doctor. In an embodiment, at least a request for a behavior modification may be linked to a desired quality displayed by at least an expert. For example, at least a request for a behavior modification such as infidelity may be linked to at least an expert who displays qualities such as family commitment, forgiveness, and wisdom. In yet another non-limiting example, at least a request for a behavior modification such as a reduced frequency of panic attacks may be linked to at least an expert who displays qualities such as peacefulness, supportiveness, and reliability. In an embodiment, at least a request for a behavior modification may be linked to a quality that is undesirable and should not be displayed by at least an expert. For example, at least a request for a behavior modification such as addiction may be linked to undesirable qualities such as drunkenness, corruption, and dishonesty that should not be displayed by at least an expert to help a user recover from addiction. In yet another non-limiting example, at least a request for a behavior modification such as implementing a meditation practice to reduce stress may be linked to undesirable qualities such as anger, rage, and jealousy that should not be displayed by at least an expert to help a user embrace a more peaceful lifestyle. Generating at least a request for an expert may be done as a function of the selected expert. Selecting the expert may include any of the methodologies as described above.

With continued reference to FIG. 14, at step 1430 the at least a server transmits the at least a request for the behavior modification to the at least a selected expert. Transmitting the at least a request for the behavior modification may be performed utilizing any of the methodologies as described herein. In an embodiment, the at least a server may receive at least an expert datum as a function of the at least a request for a behavior modification. At least an expert datum may include any information generated by an expert with regard to a user and/or a user's behavior modification. In an embodiment, at least an expert datum may include any follow-up progress or steps a user has taken with regard to a behavior modification. At least an expert datum may include information such as other experts that may be useful in forming user's inner circle to aid user in overcoming or having user's behavior modification enter a controlled state.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
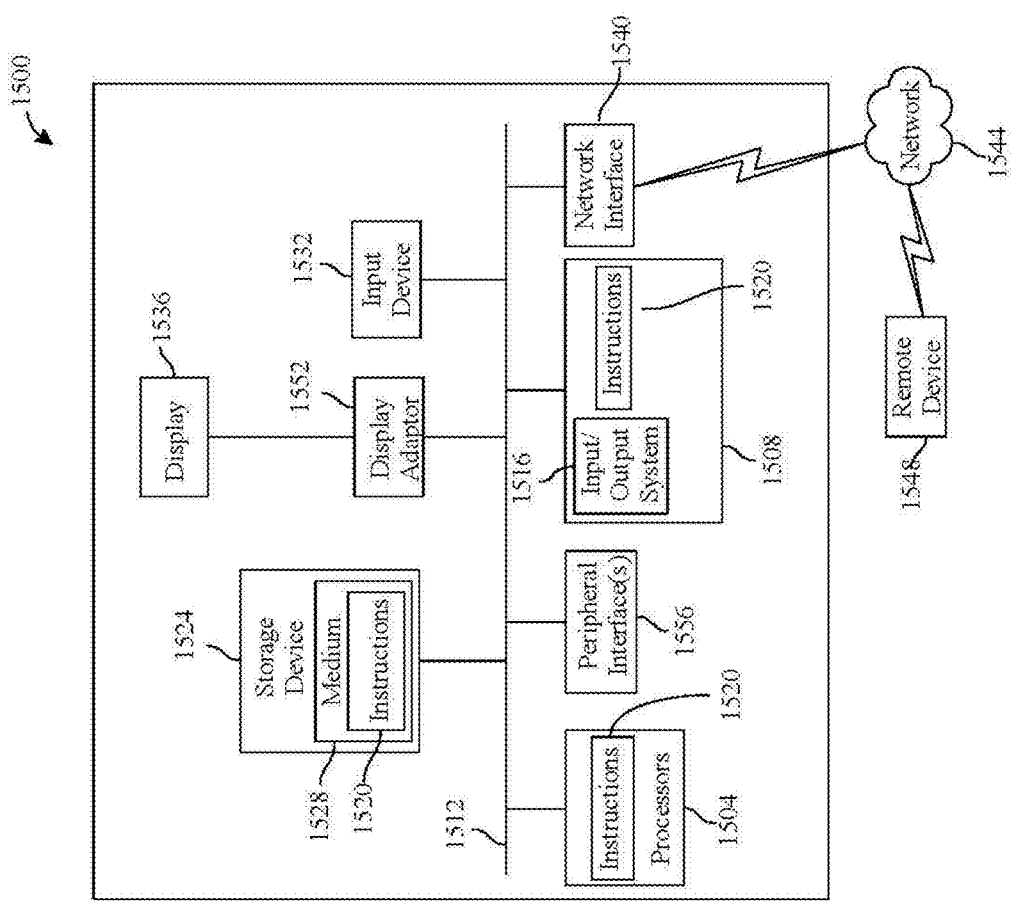
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine-readable media) including, but not limited to, a random access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an artificial intelligence support group for behavior modification, the system comprising:
   at least a server;
   a receiving module operating on the at least a server, the receiving module designed and configured to:
      receive at least a request for a behavior modification from a user client device;
      generate a language processing model, wherein generating the language processing model comprises:
         receiving a first training set, wherein the first training set associates behavior modification terms and expert quality terms;
         training, iteratively, a language processing process as a function of the first training set;
      generate at least an expert quality as a function of the language processing model, wherein the language processing model inputs the at least a request for a behavior modification and outputs the at least an expert quality;
   an expert module operating on the at least a server, the expert module designed and configured to:
      generate a machine learning model, wherein generating the machine learning model comprises:
         receiving a second training set, wherein the second training set correlates behavior modifications and expert qualities with expert lists;
         training, iteratively, a machine learning process as a function of the second training set;
      generate a plurality of expert lists as a function of the machine learning model, wherein the machine learning model inputs the at least an expert quality and the at least a request for a behavior modification and outputs the plurality of expert lists, the plurality of expert lists having different implications associated with the request for a behavior modification;
      transmit the plurality of expert lists to the user client device;
      receive at least a user input from the user client device as a function of the plurality of expert lists, wherein the at least a user input includes at least a selected expert from the plurality of expert lists;
      generate at least a request for the at least a selected expert; and
      transmit, through a client-interface module, the at least a request for a behavior modification to the user client device operated by the at least a selected expert; and
   an advisory module operating on the at least a server, wherein the advisory module is configured to:
      select at least an advisor client device as a function of the at least a selected expert, wherein selecting the at least an advisor client device comprises:
         inputting the at least a user input into an advisor machine learning module; and
         outputting the at least an advisor client device from the advisor machine learning module as a function of the at least a user input, wherein the user input includes at least a selected expert from the plurality of expert lists;
      transmit at least an advisory output to the at least an advisor client device;
      receive an advisory input from the at least an advisor client device as a function of the at least an advisory output; and
      provide the advisory input to the expert module, wherein the advisory input augments the machine learning model.

2. The system of claim 1, wherein the receiving module is further configured to receive the at least a request for a behavior modification from a user client device.

3. The system of claim 1, wherein the receiving module is further configured to receive the at least a request for a behavior modification from an advisory client device.

4. The system of claim 1, wherein generating the plurality of expert lists further comprises matching at least an expert to at least an expert quality.

5. The system of claim 1, wherein selecting at least an expert further comprises:
   producing a field of combinations of experts; and
   selecting at least an expert using a lazy-learning process.

6. The system of claim 1, wherein selecting at least an expert further comprises:
   generating a loss function of user specific variables; and
   minimizing the loss function.

7. The system of claim 6, wherein at least one of the user specific variables is a faith based quality.

8. The system of claim 1, wherein selecting at least an expert occurs as a function of a user entered category of at least an expert comprising an expert quality.

9. The system of claim 1 further comprising receiving at least an expert datum as a function of the at least a request for a behavior modification.

10. A method of an artificial intelligence support group for behavior modification, the method comprising:
   receiving, by at least a server, at least a request for a behavior modification from a user client device;
   generating, by the at least a server, a language processing model, wherein generating the language processing model comprises:
      receiving a first training set, wherein the first training set associates behavior modification terms and expert quality terms;
      training, iteratively, a language processing process as a function of the first training set;
   generating, by the at least a server, at least an expert quality as a function of the language processing model, wherein the language processing model inputs the at least a request for a behavior modification and outputs the at least an expert quality;
   generating, by the at least a server, a machine learning model, wherein generating the machine learning model comprises:
      receiving a second training set, wherein the second training set correlates behavior modifications and expert qualities with expert lists;
      training a machine learning process as a function of the second training set;
   generating, by the at least a server, a plurality of expert lists as a function of the machine learning model, wherein the machine learning model inputs the at least an expert quality and the at least a request for a behavior modification and outputs the plurality of expert lists, the plurality of expert lists having different implications associated with the request for a behavior modification;
   transmitting, by the at least a server, the plurality of expert lists to the user client device;
   receiving, by the at least a server, at least a user input from the user client device as a function of the plurality of expert lists, wherein the at least a user input includes at least a selected expert;
   generating, by the at least a server, at least a request for the at least a selected expert;
   transmitting, by the at least a server, through a client-interface module operating on the server, the at least a request for the behavior modification to the user device operated by the at least a selected expert;
   selecting, by the at least a server, at least an advisor client device as a function of the at least a selected expert, wherein selecting the at least an advisor client device comprises:
      inputting the at least a user input into an advisor machine learning module; and
      outputting the at least an advisor client device from the advisor machine learning module as a function of the at least a user input, wherein the user input includes at least a selected expert from the plurality of expert lists;
   transmitting, by the at least a server, at least an advisory output to the at least an advisor client device;
   receiving, by the at least a server, an advisory input from the at least an advisor client device as a function of the at least an advisory output; and
   augmenting, by the at least a server, the machine learning model with the advisory input.

11. The method of claim 10, wherein receiving further comprises receiving the at least a request for a behavior modification from a user client device.

12. The method of claim 10, wherein receiving further comprises receiving the at least a request for a behavior modification from an advisory client device.

13. The method of claim 10, wherein generating the plurality of expert lists further comprises matching at least an expert to at least an expert quality.

14. The method of claim 10, wherein selecting at least an expert further comprises:
   producing a field of combinations of experts; and
   selecting at least an expert using a lazy-learning process.

15. The method of claim 10, wherein selecting at least an expert further comprises:
   generating a loss function of user specific variables; and
   minimizing the loss function.

16. The method of claim 15, wherein at least one of the user specific variables is a faith based quality.

17. The method of claim 10, wherein selecting at least an expert occurs as a function of a user entered category of at least an expert comprising an expert quality.

18. The method of claim 10 further comprising receiving at least an expert datum as a function of the at least a request for a behavior modification.

* * * * *